United States Patent
Dutta

(10) Patent No.: US 12,132,605 B2
(45) Date of Patent: Oct. 29, 2024

(54) LOOP DETECTION FOR IP PACKETS

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 28 days.

(21) Appl. No.: 17/104,338

(22) Filed: Nov. 25, 2020

(65) Prior Publication Data

US 2022/0166661 A1  May 26, 2022

(51) Int. Cl.
*H04L 41/0654* (2022.01)
*H04L 45/18* (2022.01)
*H04L 45/74* (2022.01)

(52) U.S. Cl.
CPC .......... *H04L 41/0654* (2013.01); *H04L 45/18* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 7,330,440 B1 * | 2/2008 | Bryant | H04L 45/28 370/254 |
| 9,712,559 B2 * | 7/2017 | Gospodarek | H04L 63/1466 |
| 9,832,039 B2 * | 11/2017 | Ooi | H04L 45/18 |
| 2004/0167977 A1 * | 8/2004 | Douglas | H04L 41/22 709/224 |
| 2004/0172466 A1 * | 9/2004 | Douglas | H04L 41/22 709/224 |
| 2004/0252694 A1 * | 12/2004 | Adhikari | H04L 45/20 370/395.2 |

(Continued)

FOREIGN PATENT DOCUMENTS

| | | |
|---|---|---|
| JP | H06 232908 A | 8/1994 |
| WO | WO 2002/098157 A1 | 12/2002 |
| WO | 2019239171 A1 | 12/2019 |

OTHER PUBLICATIONS

Atlas, A., et al., "Basic Specification for IP Fast Reroute: Loop-Free Alternates", Network Working Group, Request for Comments: 5286, Sep. 2008, 31 pages.

(Continued)

*Primary Examiner* — Lonnie V Sweet
(74) *Attorney, Agent, or Firm* — Tong, Rea, Bentley & Kim, LLC

(57) ABSTRACT

A node is configured for deployment in an IP network. The node includes a memory configured to store a first identifier that uniquely identifies the node within the IP network. The node also includes a transceiver configured to receive a first IP packet. The node further includes a processor configured to selectively forward the first IP packet based on whether a first recorded route (RR) in the first IP packet includes the first identifier. Selectively forwarding the first IP packet includes dropping the first IP packet in response to the first identifier being in the first IP packet or pushing the first identifier onto the first RR in the first IP packet in response to the first identifier not being in the first IP packet.

11 Claims, 23 Drawing Sheets

(56) References Cited

U.S. PATENT DOCUMENTS

| | | | | |
|---|---|---|---|---|
| 2008/0225713 | A1* | 9/2008 | Tychon | H04L 45/22 370/231 |
| 2009/0238080 | A1* | 9/2009 | Hirano | H04L 45/00 370/241 |
| 2016/0254998 | A1* | 9/2016 | Jokela | H04L 45/34 370/390 |
| 2021/0243107 | A1* | 8/2021 | Retana | H04L 45/34 |

OTHER PUBLICATIONS

Shand, M., et al., "A Framework for Loop-Free Convergence", Internet Engineering Task Force, Request for Comments: 5715, Jan. 2010, 22 pages.

Shand, M., et al., "Framework for Loop-Free Convergence Using the Ordered Forwarding Information Base (oFIB) Approach", Internet Engineering Task Force, Request for Comments: 6976, Jul. 2013, 28 pages.

U.S. Appl. No. 17/030,667, filed Sep. 24, 2020 listing Dutta, Pranjal Kumar as first inventor, entitled, "U-Turn Indicator in Internet Protocol Packets,", 423 pages.

Postel, J., "Internet Control Message Protocol: DARPA Internet Program Protocol Specification", Network Working Group, Request for Comments: 792, Sep. 1981, 23 pages.

Conta, A., et al. "Internet Control Message Protocol (ICMPv6) for the Internet Protocol Version 6 (IPv6) Specification", Network Working Group, Request for Comments: 4443, Mar. 2006, 24 pages.

Katz, D., et al., "Bidirectional Forwarding Detection (BFD) for Multihop Paths", Internet Engineering Task Force, Request for Comments: 5883, Jun. 2010, 6 pages.

University of Southern California Information Sciences Institute, "Internet Protocol: DARPA Internet Program Protocol Specification", Request for Comments: 791, Sep. 1981, 49 pages.

Deering, S., et al., "Internet Protocol, Version 6 (IPv6) Specification", Network Working Group, Request for Comments: 2460, Dec. 1998, 39 pages.

Katz, D., "IP Router Alert Option", Network Working Group, Request for Comments: 2113, Feb. 1997, 4 pages.

Partridge, C., et al., "IPv6 Router Alert Option", Network Working Group, Request for Comments: 2711, Oct. 1999, 6 pages.

Atlas et al., "Basic Specification for IP Fast Reroute: Loop-Free Alternatives", Network Working Group, RFC 5286, Sep. 2008, 31 pages.

Shand et al., "Framework for Loop-Free Convergence Using the Ordered Forwarding Information Base (oFIB) Approach", Internet Engineering Task Force (IETF), RFC 6976, Jul. 2013, 28 pages.

Deering et al., "Internet Protocol, Version 6 (IPv6) Specification", Network Working Group, RFC 2460, Dec. 1998, 39 pages.

Conta et al., "Internet Control Message Protocol (ICMPv6) for the Internet Protocol Version 6 (IPv6) Specification", Network Working Group, RFC 4443, Mar. 2006, 24 pages.

Katz et al., "Bidirectional Forwarding Detection (BFD) for Multihop Paths", Internet Engineering Task Force (IETF), RFC 5883, Jun. 2010, 6 pages.

"Internet Protocol DARPA Internet Program Protocol Specification", RFC 791, Sep. 1981, 49 pages.

Partridge et al., IPv6 Router Alert Option, Network Working Group, RFC 2711, Oct. 1999, 6 pages.

Katz, "IP Router Alert Option", Network Working Group, RFC 2113, Feb. 1997, 4 pages.

Shand et al., "A Framework for Loop-Free Convergence", Internet Engineering Task Force (IETF), RFC 5715, Jan. 2010, 22 pages.

Postel, "Internet Control Message Protocol, DARPA Internet Program Protocol Specification", Network Working Group, RFC 792, Sep. 1981, 21 pages.

U.S. Appl. No. 17/030,667, filed Sep. 24, 2020, listing Pranjal Kumar Dutta as inventor, entitled "U-Turn Indicator in Internet Protocol Packets".

EP Search Report in corresponding EP Patent Application No. 21208165.7 dated Apr. 28, 2022, 8 pages.

* cited by examiner

```
+-+-+-+-+-+-+-+-+-+-+-+-+-+-+-+-+-+-+-+-+-+-+-+-+-+-+-+-+-+-+-+-+
| Next Header  |  Hdr Ext Len |                                 |
+-+-+-+-+-+-+-+-+-+-+-+-+-+-+-+                                 +
|                                                               |
.                                                               .
.                          Options                              .
.                                                               .
|                                                               |
+-+-+-+-+-+-+-+-+-+-+-+-+-+-+-+-+-+-+-+-+-+-+-+-+-+-+-+-+-+-+-+-+
```
                            1700

FIG. 17

```
+-+-+-+-+-+-+-+-+-+-+-+-+-+-+-+-
| Option Type  | Opt Data Len | Option Data
+-+-+-+-+-+-+-+-+-+-+-+-+-+-+-+-
```
                            1800

FIG. 18

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Option Type   | Opt Data Len  |   Reserved    |     Flags     |
+-+-+-+-+-+-+-+-+-+-+-+-+-+-+-+-+-+-+-+-+-+-+-+-+-+-+-+-+-+-+-+-+
|                                                               |
+                                                               +
|                       Originator's Address                    |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                          Address[1]                           +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                          Address[2]                           |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
~                                                               ~
|                                                               |
+-+-+-+-+-+-+-+-+-+-+-+-+-+-+-+-+-+-+-+-+-+-+-+-+-+-+-+-+-+-+-+-+
```

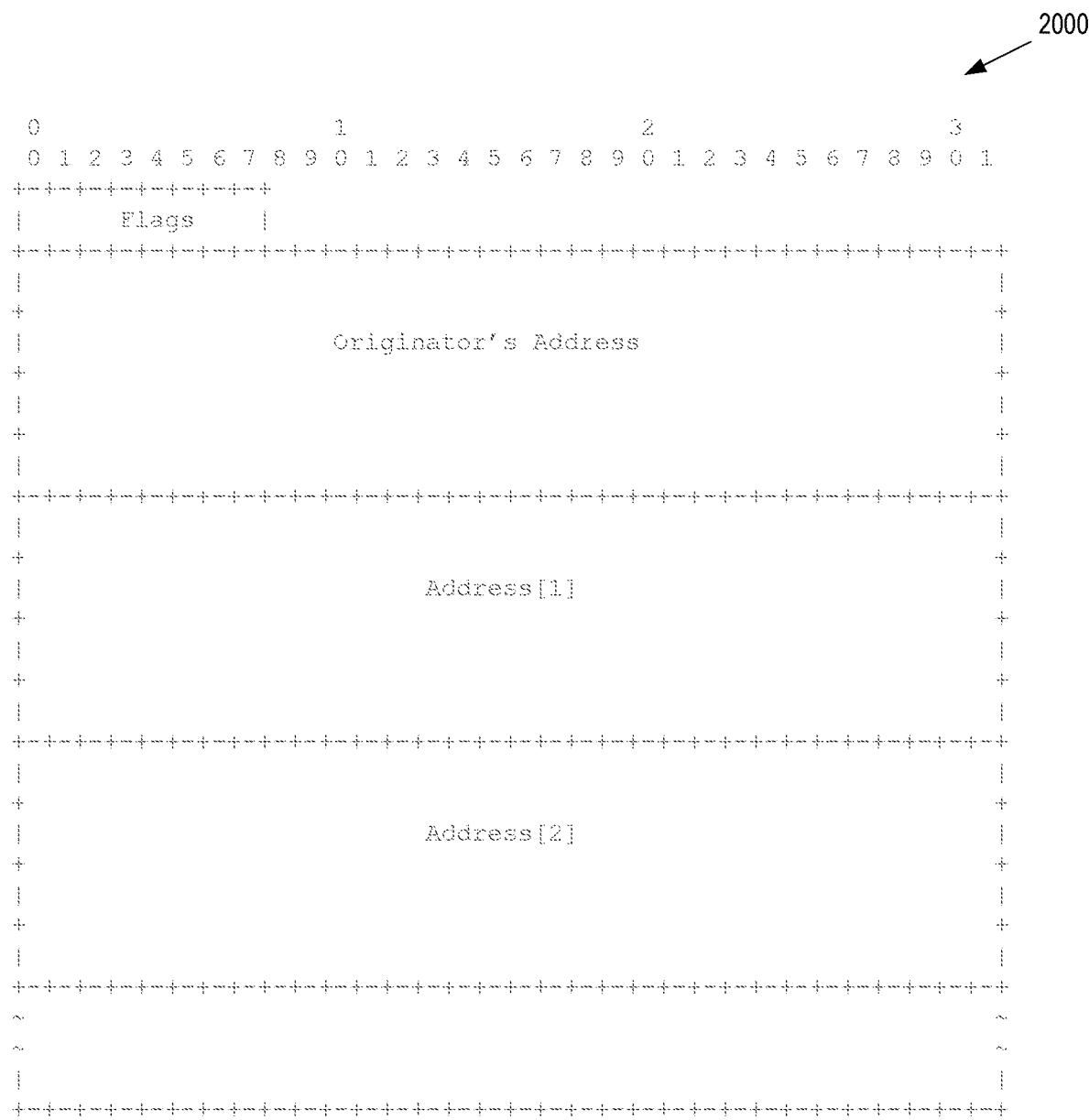
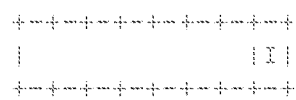
FIG. 20

LOOP DETECTION FOR IP PACKETS

BACKGROUND

Networks that operate according to the Internet Protocol (IP) include nodes such as routers that forward packets over corresponding links between the nodes. A link state protocol floods the status of locally connected networks and links of the nodes across the network. Each node builds an identical copy of the network topology based on the status information and then independently computes the paths to every other node (and any advertised networks), using path algorithms such as Dijkstra's Shortest Path First (SPF) algorithm, which computes the shortest paths between the nodes in a graph that represents the network. The nodes store routing information for the network topology in corresponding forwarding tables or routing tables. Packets received by the nodes are then forwarded based on destination information included in IP headers of the IP packets and corresponding information in the forwarding tables or routing tables. This is the default mode of forwarding of IP packets, which is referred to herein as "destination-based routing."

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

FIG. 15 is a 1-octet field that is used to carry flags in an IP shim header according to some embodiments.

FIG. 17 is a hop-by-hop options header according to some embodiments.

FIG. 18 is a type-length-value (TLV) encoded option field as an option in hop-by-hop options header according to some embodiments.

FIG. 19 is a record route (RR) option for a hop-by-hop options header according to some embodiments.

FIG. 20 is a format for a payload of Type 9 according to some embodiments.

DETAILED DESCRIPTION

Figure 1:
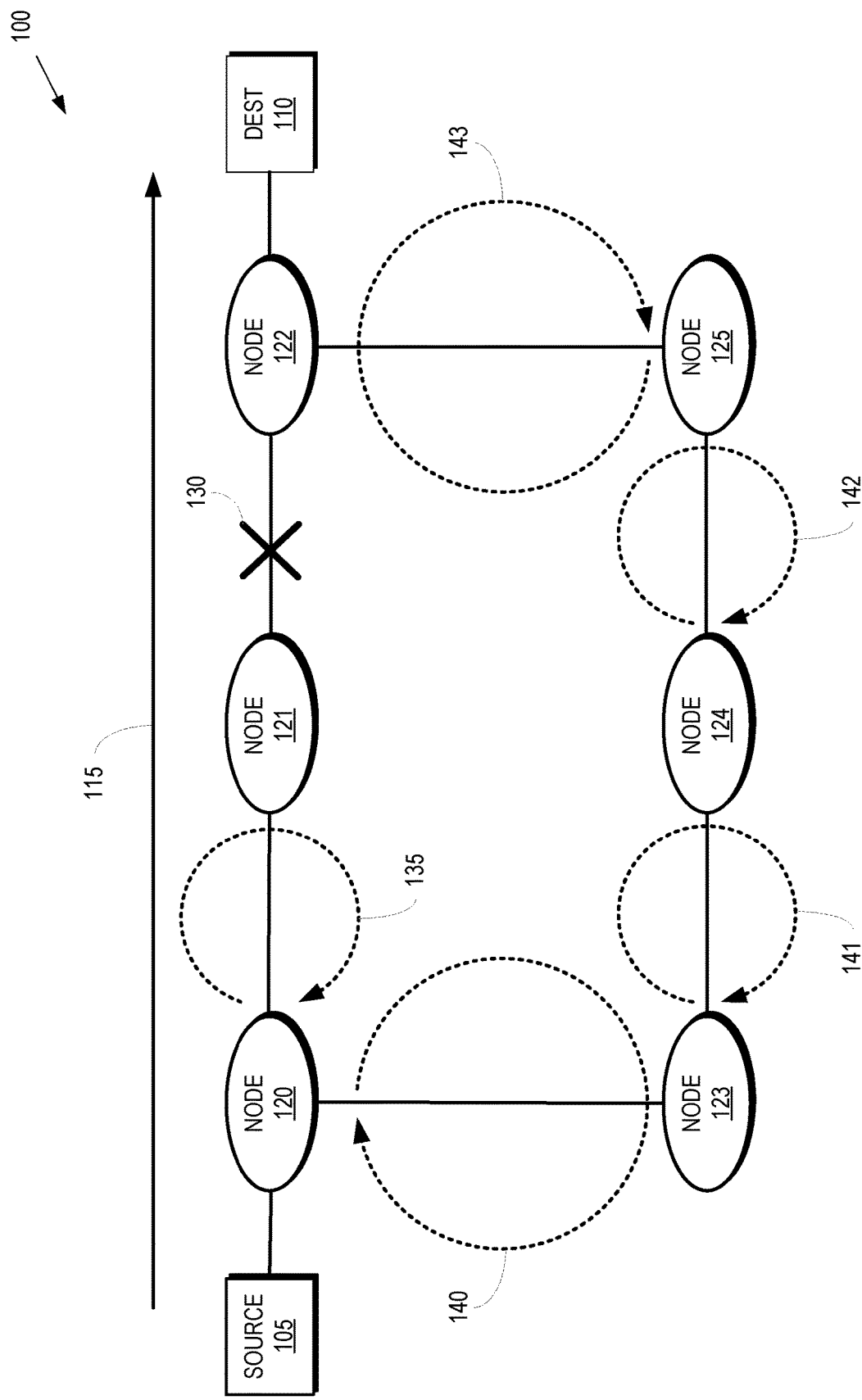
FIG. 1 is a block diagram of the communication system that has developed micro-loops during convergence of an IP routing algorithm according to some embodiments.

Although the nodes and links in IP networks are generally reliable, forwarding of packets can be disrupted by link failures, node failures, errors in the forwarding tables, and the like. The effects of outages are reduced in some cases by computing alternate paths that are used in the event of link or node failures. For example, fast rerouting techniques are used to forward IP packets along precomputed loop free alternate (LFA) paths without incurring loss during a period of outage using redundancy in the IP network to provide the LFA paths through the network. In response to detecting a link failure, the IP network reruns a shortest path algorithm for the routing protocol assuming that the failed link does not exist, which produces an alternate path that bypasses the failed link and allows the network to resume forwarding traffic (if there was no LFA path for fast rerouting) or redirecting traffic from the LFA path to the new alternate path (if packets are being fast rerouted through LFA path after the failure). Examples of routing protocols that support fast rerouting include the Interior Gateway Protocols (IGPs) such as IP networks that operate according to the Intermediate System to Intermediate System (IS-IS) routing protocol, the Open Shortest Path First (OSPF, OSPFv3) protocols, and the like.

Link failures or other outages in an IP network that block communication between nodes create the potential for loops.

For example, a loop occurs if a forwarding table at a first node forwards a packet towards a second node and the forwarding table at the second node directs the IP packet back to the first node. The loop is referred to herein as a "micro loop" if the first and second nodes are adjacent to each other and no other nodes intervene between the first and second nodes. The loop is referred to herein as a "macro loop" if the loop includes one or more other nodes between the first node and the second node. As another example, a loop is created if a first node in the network responds to a link failure along a primary path by forwarding packets along an LFA path and if a second node responds to another, concurrent link failure by rerouting the IP packets along another LFA path that traverses the first node. Loops that do not resolve themselves without intervention (e.g., without repair or reconfiguration of a link or node) are referred to as permanent loops. Permanent loops can occur due to various reasons such as incorrect path computation by IGPs or other entities, incorrect programming of a destination in forwarding table, and the like. Loops that can resolve themselves without intervention are referred to as transient loops. For example, a transient loop can occur in response to a topology change before convergence of the shortest path algorithm at the nodes in the network. The topology change can create loops prior to convergence of the shortest path algorithm. The loops typically resolve in response to convergence of the shortest path algorithm, although the convergence time can be significant and grows with the size of the network. In principle, the effects of the transient loops could be eliminated by speeding the whole convergence process to almost zero, but fundamental limits such as the speed of light and memory update latency make this highly unlikely or impossible.

FIGS. 1-29 disclose embodiments of nodes that detect looping Internet protocol (IP) packets after a single micro-loop or macro-loop using a recorded route (RR) that is included in an IP header in the IP packets. The RR includes router addresses of the nodes that previously received and forwarded the IP packet. In response to receiving an IP packet, the node compares the router addresses in the RR of the IP header in the IP packet to its own router address. If the node does not find its router address in the RR, the node pushes its router address onto the RR and forwards the IP packet to the next hop based on information in the forwarding table at the node. If the node detects its router address in the RR, which indicates that the IP packet has traversed a loop back to the node after the first reception of the IP packet at the node, the node drops the IP packet. In some embodiments, the node provides a loop detection notification that identifies the node (e.g., using its router address) and includes the RR to facilitate diagnosis and repair of the loop. In some embodiments, loop detection is enabled for nodes in response to rerouting of a packet that encountered a link failure in the network. Nodes that implement selective enabling of loop detection also examine received packets to determine whether an RR is present. If so, the node enables loop detection on the packet and examines the router addresses in the RR of the IP header, e.g., loop detection is performed on a packet-by-packet basis. An ingress node can add an RR including its router address to packets if loop detection is enabled, either selectively or by default.

FIG. 1 is a block diagram of the communication system 100 that has developed micro-loops during convergence of an IP routing algorithm according to some embodiments. The communication system 100 provides communication pathways to convey packets from a source 105 to a destination 110, as indicated by the arrow 115. The source 105 and the destination 110 are implemented in one or more entities such as desktop computers, laptop computers, tablet computers, smart phones, Internet of Things (IoT) devices, and the like. The communication system 100 includes a set of nodes 120, 121, 122, 123, 124, 125, which are collectively referred to herein as "the nodes 120-125."

Packets are conveyed from the source 105 to the destination 110 along a path that includes the nodes 120-122. In the illustrated embodiment, a link between the node 121 and the node 122 fails, as indicated by the cross 130. In response to failure of the link, the node 121 sends a link state update that informs the nodes 120-125 that the link has failed. The SPF algorithm implemented in the nodes 120-125 eventually recomputes their respective paths to 105 and 110 based on the modified topology. For some of the nodes the path to 105 or 110 may change or may not change depending on whether the link 130 was along the shortest paths to the respective hosts. Due to failure of the link 130, the shortest path from the source 105 to the destination 110 is from the node 120 to the node 122 via the nodes 123-125. Each node independently computes SPF algorithm and eventually updates the appropriate forwarding table entry for 110 along that path. However, the SPF algorithm takes a finite amount of time to converge at the nodes 120-125 and does not necessarily converge at the same time at all the nodes 120-125, which can result in the nodes 120-125 forwarding IP packets to 110 along an inconsistent path.

Loops form between the nodes 120-125 while the SPF algorithms are converging at the nodes 120-125. For example, if the SPF algorithm at the node 121 converges before the SPF algorithm at the node 120, the node 120 continues to forward IP packets to the node 121 (along the original shortest path) and the node 121 forwards the IP packets back to the node 120 (along the new shortest path), thereby forming a loop 135. In response to the SPF algorithm converging at the node 120, the node 120 forwards packets to the node 123. However, if the SPF algorithm has not yet converged at the node 123, the node 120 forwards IP packets to the node 123 (along the new shortest path) and the node 123 forwards the IP packets back to the node 120 (along the original shortest path) thereby forming a loop 140. In a similar manner, loops 141, 142, 143 can form while the SPF algorithm is converging at the nodes 122, 124, 125. The loops 135, 140-143 form between pairs of nodes 120-125 and are therefore referred to herein as micro-loops. The duration of the loops is proportional to the time required to propagate the topology change through the network, as well as the time required for the SPF algorithm to converge at the nodes 120-125 and for the nodes 120-125 to update the forwarding tables.

In principle, the effects of the micro-loops could be eliminated by speeding the whole convergence process to almost zero, but fundamental limits such as the speed of light and memory update latency make this highly unlikely or impossible. Some embodiments of ethernet networks reduce the impact of network failures using Fast-Rerouting (FRR) of packets in the network. The FRR technique uses loop free alternate (LFA) paths computed by link state protocols as a backup path if the backup path doesn't cause a forwarding loop. To avoid forwarding loops, the nodes 120-125 perform additional calculations to verify that a candidate backup path does not create a forwarding loop. A path that does not cause a forwarding loop is identified as an LFA path. The nodes 120-125 identify the LFA paths in advance and install them against the respective primary paths (shortest paths) into the forwarding table.

Figure 2:
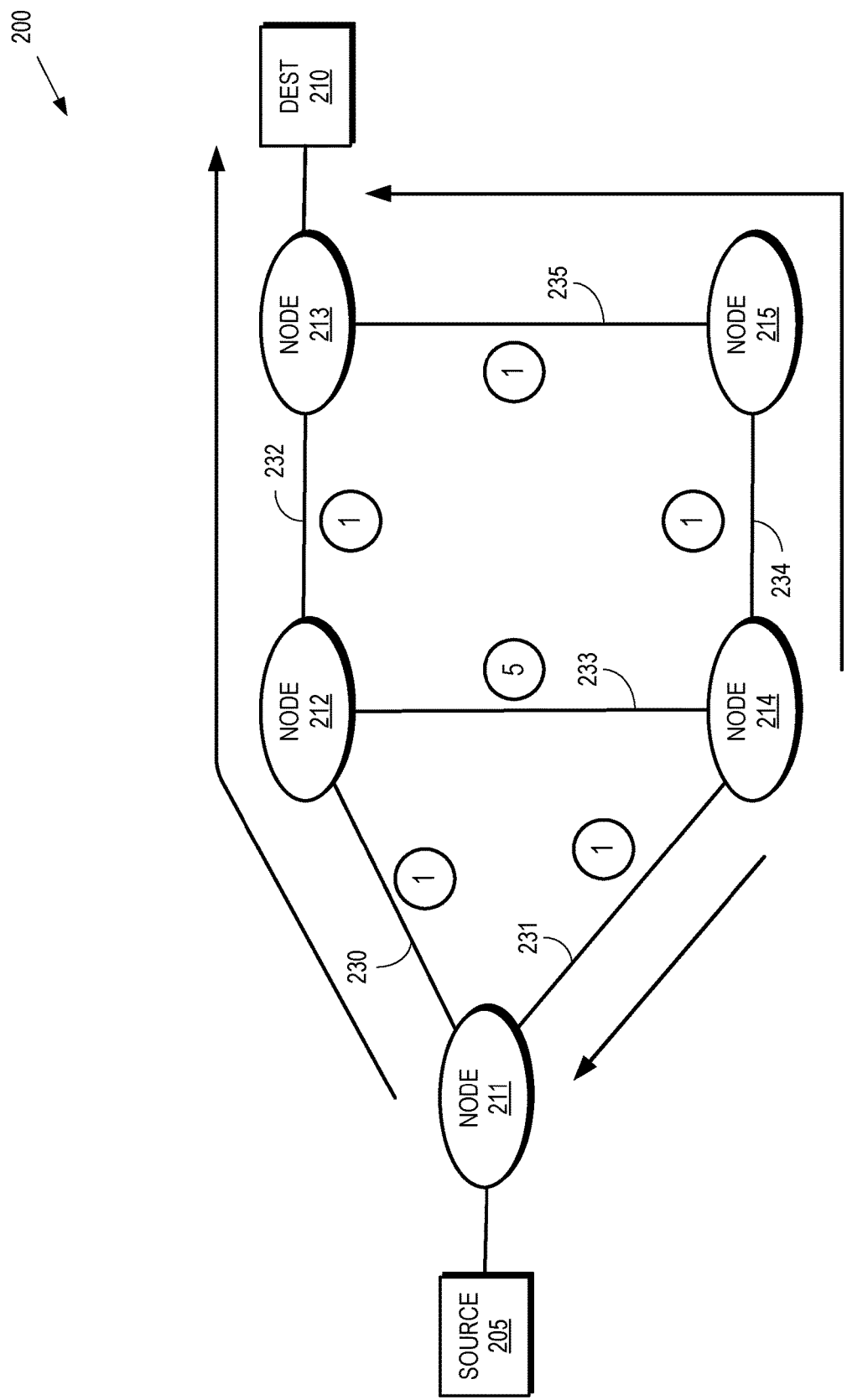
FIG. 2 is a block diagram of a communication system that computes backup paths based on metrics or costs associated with links according to some embodiments.

FIG. 2 is a block diagram of a communication system 200 that computes backup paths based on metrics or costs associated with links according to some embodiments. The communication system 200 provides communication pathways to convey packets from a source 205 to a destination 210. The communication system 200 includes a set of nodes 211, 212, 213, 214, 215, which are collectively referred to herein as "the nodes 211-215." The nodes 211-215 are interconnected by corresponding links 230, 231, 232, 233, 234, 235, which are collectively referred to herein as "the links 230-235." The metric or cost of the links 230-235 are shown in circles alongside the links 230-235.

In the illustrated embodiment, the node 211 is connected to the source 205 of IP packets and therefore calculates paths through the communication system 200. The nodes 212, 214 are neighbors of the node 211. The node 213 is connected to the destination 210 and so the node 213 advertises the destination 210 as a local destination in the link state protocol. The node 211 computes the shortest path to the node 213 as node 211→node 212→node 213, which is a total cost of 2. For this path, the node 212 is the primary next hop. The node 211 also computes an alternate, loop-free, path as node 211→node 214→node 215→node 213 because the shortest path to 213 from the node 214 is not through the local router 211. Traffic sent by the node 211 to the backup next hop 214 is not sent back to the node 211 so the node 211 can use the node 214 as a backup next hop for the path to the node 213. The node 211 therefore programs the path to the node 213 (and all its attached hosts) into its Forwarding table with the node 212 as the primary next hop and the node 214 as the backup next hop. In response to the link 230 failing, the node 211 fast reroutes IP packets to the node 213 via the backup next hop which is the node 214, which forwards the IP packets along the primary path node 214→node 215→node 213.

In some embodiments, the node 214 computes an LFA path to the node 213 to protect against failure of its primary next-hop node 215. As evident from the topology, the alternate path node 214→node 211→node 212→node 213 (total cost 3) is loop-free, because the shortest path for the node 211 to node 213 (node 211→node 212→node 213, cost 2) is not via the node 214. Thus, the node 214 programs the node 213 (and all its attached hosts) into its forwarding table with the node 215 as the primary next-hop and the node 211 as backup next-hop.

Figure 3:
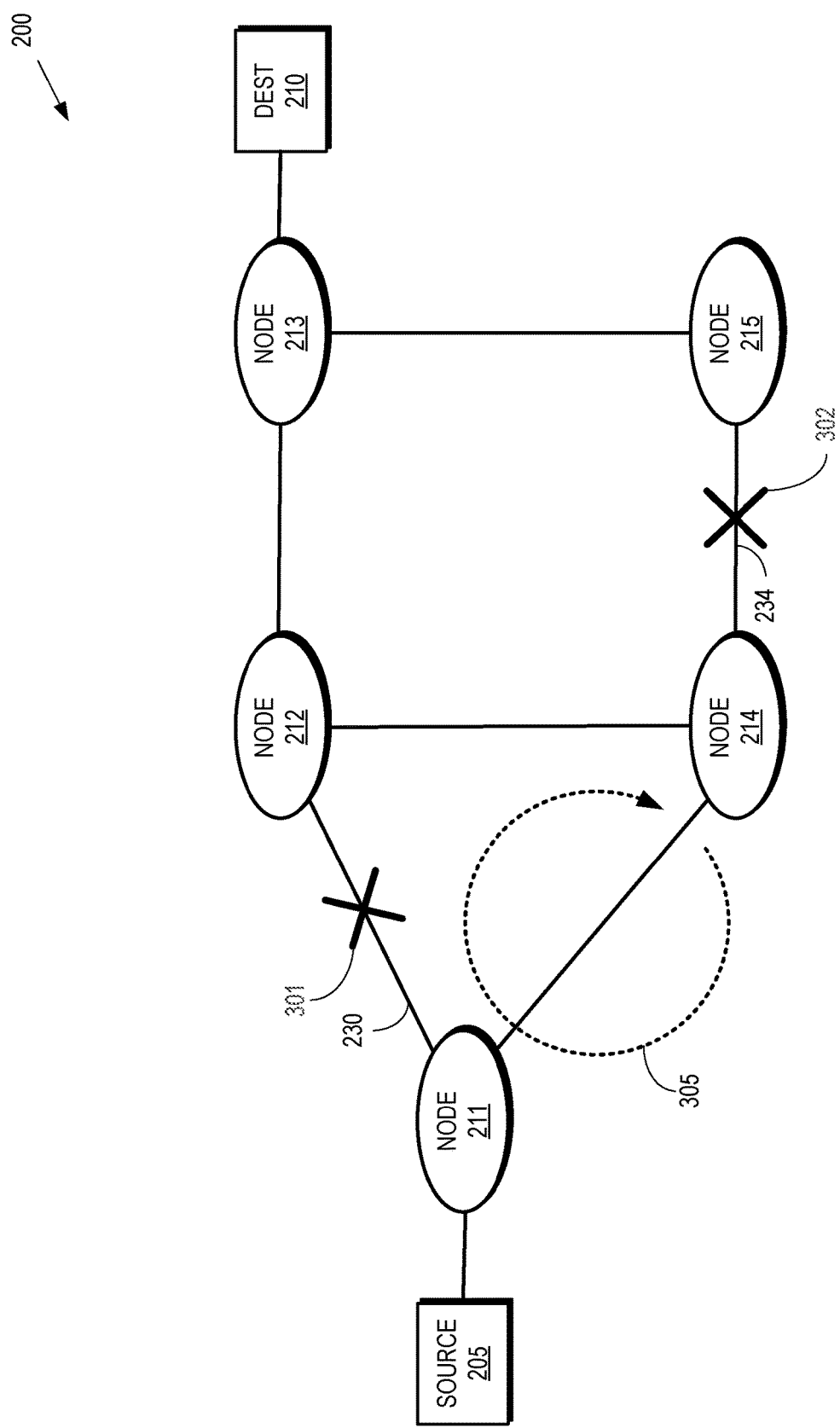
FIG. 3 is a block diagram of the communication system that uses the backup paths during concurrent failure of multiple links according to some embodiments.

FIG. 3 is a block diagram of the communication system 200 that uses the backup paths during concurrent failure of multiple links according to some embodiments. In the illustrated embodiment, the link 230 between the node 211 and the node 212 fails concurrently with the link 234 between the node 214 and the node 215, as indicated by the crosses 301, 302. Thus, both the primary path and the alternate path that were previously calculated using the SPF algorithms in the nodes 211-215 are interrupted by the concurrent link failures. Failure of the link 230 between the node 211 and the node 212 causes the node 211 to fast reroute IP packets along the alternate path to the next hop node 214. However, failure of the link between the node 214 and the node 215 causes the node 214 to fast reroute IP packets along the alternate path to the next hop node 211. A loop 305 is therefore formed between the node 211 and the node 214 due to the multiple link failures. The loop 305 persists until the SPF algorithms executed by the nodes 211-215 converge to a new solution in the presence of the link failures, e.g., a new shortest path from the source 205 to the destination 210 that conveys packets along a path from the node 211 to the node 214 to the node 212 to the node 213.

Figure 4:
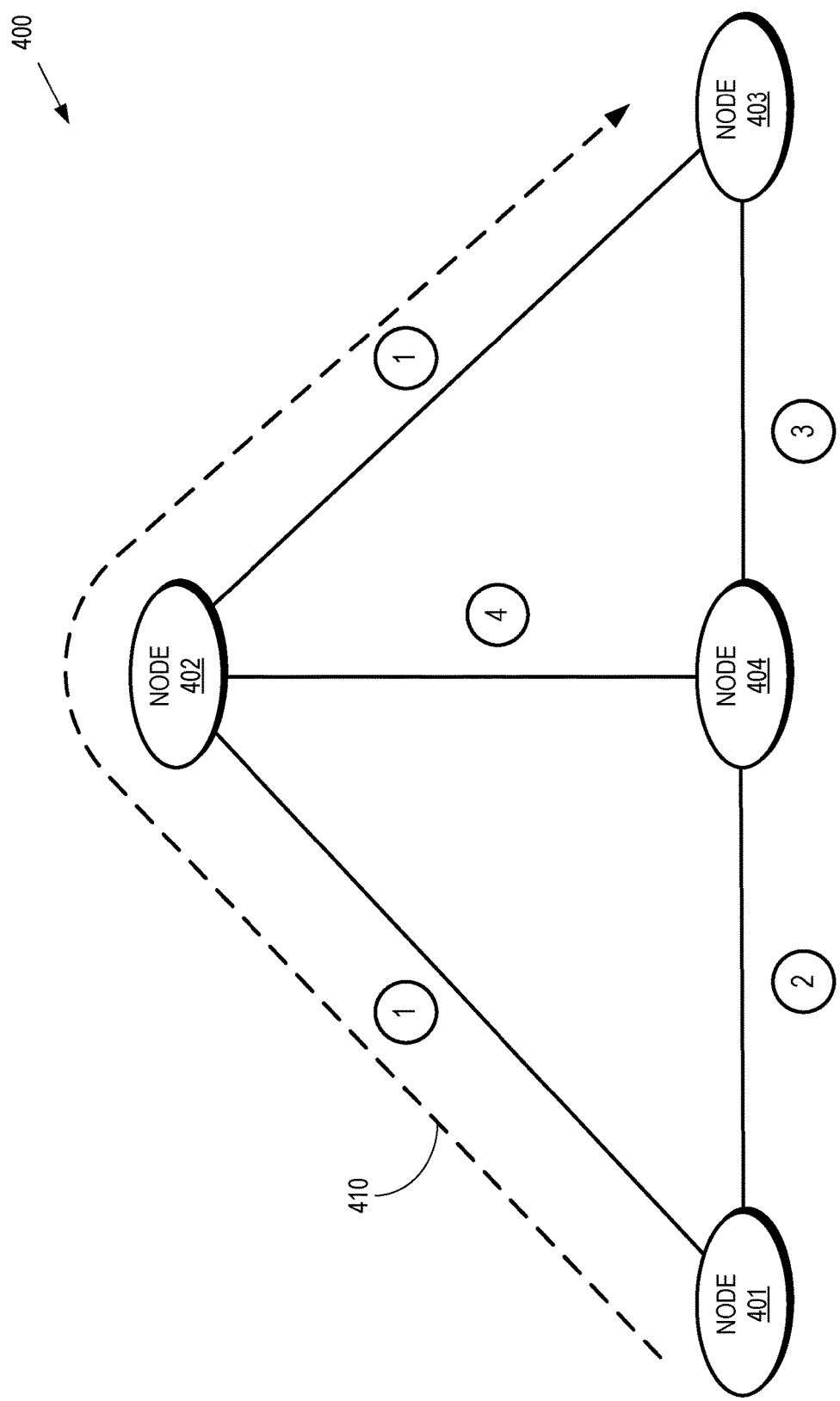
FIG. 4 is a block diagram of a communication system that determines a primary shortest path and an alternate shortest path using a shortest path first (SPF) algorithm according to some embodiments.

FIG. 4 is a block diagram of a communication system 400 that determines a primary shortest path and an alternate shortest path using a shortest path first (SPF) algorithm according to some embodiments. The communication system 400 includes nodes 401, 402, 403, 404, which are collectively referred to herein as "the nodes 401-404." In the illustrated embodiment, the node 401 is a source router that is connected to a source and the node 403 is a destination router that is connected to a destination. The metrics or costs of the links are indicated in the circled numerals. For example, the cost of the link between the node 401 and the node 402 is one and the cost of the link between the node 402 and the node 404 is four.

The nodes 401, 402, 404 compute the primary and alternate shortest paths to the destination node 403 based on the metrics or costs. The node 401 computes a primary path that includes the nodes 401, 402, 403 (at a cost of two) and an alternate path that includes the nodes 401, 404, 403 (at a cost of five). The primary path from the node 401 to the node 403 as indicated by the arrow 410. The node 402 computes a primary path that includes the nodes 402, 403 (at a cost of one) and an alternate path that includes the nodes 402, 404, 403 (at a cost of seven). The node 404 computes a primary path that includes the nodes 404, 403 (at a cost of three) and an alternate path that includes the nodes 404, 401, 402, 403 (at a cost of four).

Figure 5:
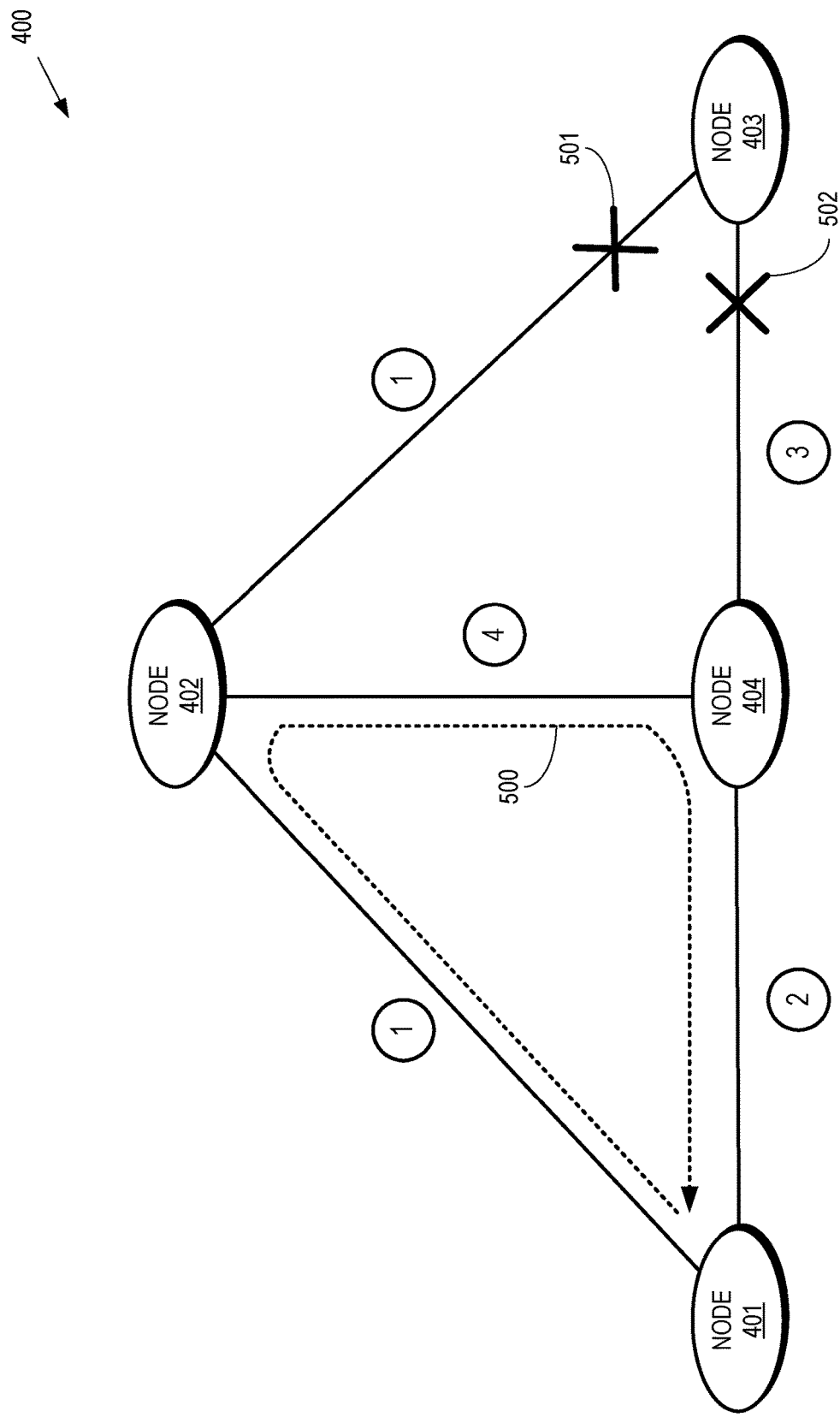
FIG. 5 is a block diagram of the communication system that forms a macro-loop in response to concurrent failure of multiple links according to some embodiments.

FIG. 5 is a block diagram of the communication system 400 that forms a macro-loop 500 in response to concurrent failure of multiple links according to some embodiments. In the illustrated embodiment, the link between the node 402 and the node 403 fails concurrently with the link between the node 404 and the node 403, as indicated by the crosses 501, 502. In response to receiving an IP packet from the node 401, the node 402 detects the failure of the link to the node 403 and reroutes the received IP packet via its previously calculated alternate path to the next hop node 404. In response to receiving the IP packet from the node 402, the node 404 detects the failure of the link to the node 403 and reroutes the received packet via its previously calculated alternate path to the node 401, which forwards the IP packet via its primary path to the node 402, thereby forming a macro-loop 500 including the nodes 401, 402, 404. In this case, the macro-loop 500 resolves in response to convergence of the SPF algorithm at the nodes 401-404 following the link failures.

Macro-loops also form in the communication system 400 in non-failure scenarios. For example, if the nodes 402, 404 incorrectly compute the shortest paths or incorrectly update the forwarding table based on a correctly computed shortest path, the macro-loop 500 can form in the communication system 400. In response to receiving an IP packet from the node 401, the node 402 forwards the received IP packet based on the incorrectly calculated or stored shortest path to the next hop node 404. In response to receiving the IP packet from the node 402, the node 404 forwards the received IP packet based on the incorrectly calculated or stored shortest path to the node 401, which forwards the IP packet via its primary path to the node 402, thereby forming the macro-loop 500 including the nodes 401, 402, 404. In this case, the macro-loop 500 is not transient and may not be resolved without intervention.

The IPv4 header carries a Time To Live (TTL) field and the IPv6 header carries a "Hop Limit" field, which are generically referred to as TTL fields. The source of an IP packet sets a TTL value to indicate the maximum number of allowable hops to reach the destination of the packet. Routers that forward the packet decrement the TTL value by one. If the TTL becomes zero, then the router drops the packet. This TTL field can be used for detection of loops experienced by IP packets since TTL becomes zero (expires) eventually for a looping packet. However, the TTL expiry is not an efficient method as it allows the packets to keep looping until the TTL expires or until routing table convergence fixes the loop. Whenever a time transient loop exists, it causes some collateral damage. A looping packet may amplify traffic and consume bandwidth until the TTL expires or the packet escapes in response to routing table convergence. This can transiently cause congestion even on a well-provisioned link by increasing the traffic. This congestion reduces the bandwidth for other traffic (which would not have been affected otherwise) and causes delay and congestive packet loss on the links. The duration of the delay is equal to the duration of the loop. If the loop is a permanent one due to misbehaviour of the routers, then packets continue to loop until the TTL expires. For example, if node 401 shown in FIG. 5 sends the IP packets to node 403 with TTL 255 (e.g., a maximum value, which is usually the default value while originating IP packets). The packet makes 85 rounds on the macro-loop 500 before the TTL expires and the packet is dropped. The bandwidth consumption around the loop is therefore amplified by a multiplicative factor of 85. To generalize, if a loop consists of N routers and the TTL before the start of the loop is T, then a packet makes at least T/N loops before it is dropped in response to expiration of the TTL. Second, in the TTL expiry method, there is no meaningful way to report the set of routers involved in the loop so that administrative actions can be taken; the first router that expires the TTL drops the packet and is agnostic of the nature of the loop.

Loop detection is therefore performed using a list of router addresses that is referred to herein as a "Recorded Route" (RR). The list describes the set of routers traversed along a path in their order of occurrence in the path. For example, RR for the path that includes the nodes 401-403 is {401, 402, 403}, where the reference numeral for the node represents the router address of the corresponding router. The RR is encoded as an extension to IP Header of the packet for which loop detection is being performed.

Loop detection is performed using the RR as follows. A router along the path that intends to enable loop detection on an IP packet incorporates an RR into the IP Header. The router encodes its own router address in the RR, e.g., the address of the originating router is the only router address in RR at this point. When a router receives an IP packet with RR at the top, the receiving router performs the following actions:

Scans the router addresses in the RR to check for the presence of its configured router address.
If its configured router address is found in the RR, it means the packet has traversed this router before and there is a loop somewhere in the network. Following actions are taken.
  Drops the packet.
  Some embodiments of the receiving router generate a loop detection notification that is provided to a reporting entity with a copy of the dropped IP packet. In the notified copy of the packet, the router address of the receiving router is appended to RR. From the notified packet, the reporting entity can figure out the routers along the looped path by tracing back the router addresses in the RR from last entry till the recurrence of the same value as the last entry.
If the configured router address of the receiving router is not found in the RR, then the receiving router makes a forwarding decision based on its routing table.
  If destination address in IP header is a local address of this router, then it means this router is the destination of the IP packet. Then while removing the IP header, it also removes RR along with, and makes further decision based on the payload of the IP packet.
  If the packet is to be forwarded, then
    If the destination address belongs to a network locally connected to the router (e.g., LAN) then it removes the RR from the packet, else it appends its configured router address onto the RR.
  Forwards the packet to its designated next hop.

Figure 6:
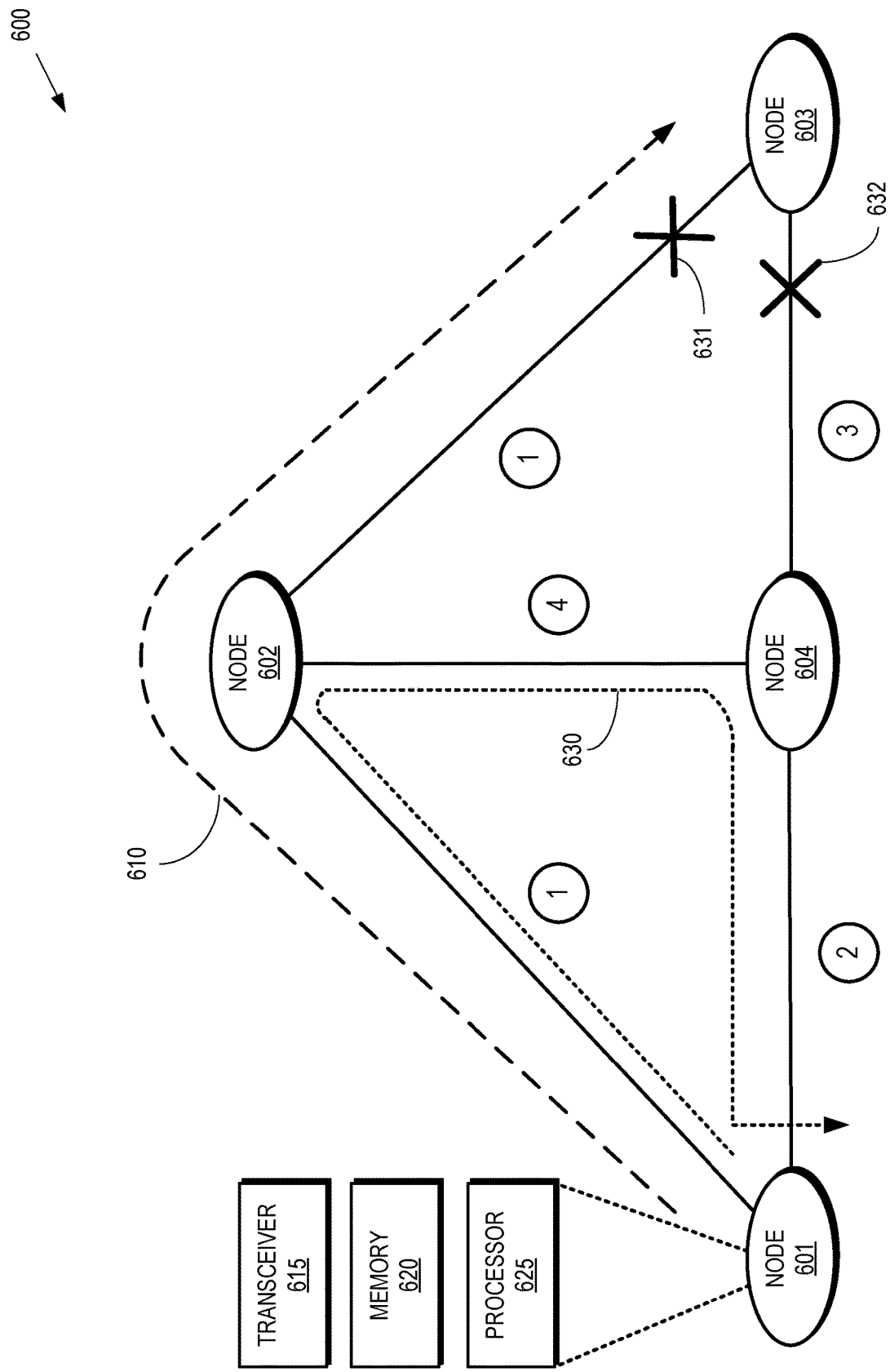
FIG. 6 is a block diagram of a communication system that performs loop detection based on a recorded route (RR) according to some embodiments.

FIG. 6 is a block diagram of a communication system 600 that performs loop detection based on a recorded route (RR) according to some embodiments. The communication system 600 includes nodes 601, 602, 603, 604, which are collectively referred to herein as "the nodes 601-604." In the illustrated embodiment, the node 601 is a source router that is connected to a source and the node 603 is a destination router that is connected to a destination. The metrics or costs of the links are indicated in the circled numerals. For example, the cost of the link between the node 601 and the node 602 is one and the cost of the link between the node 602 and the node 604 is four. The nodes 601-604 calculate SPF routes and LFA routes based on the link costs, e.g., as discussed herein with regard to FIG. 4. The primary path from the node 601 to the node 603 as indicated by the arrow 610. The nodes 601-604 include a transceiver (or a combination of receivers and transmitters) for transmitting and receiving signals representing IP packets, processors for performing operations as discussed herein, and memories for storing instructions to be executed by the processors, information to be operated on using the instructions, and results of the instructions executed by the processors. For example, the node 601 includes a transceiver 615, a processor 620, and memory 625.

In the illustrated embodiment, the link between the node 602 and the node 603 fails concurrently with the link between the node 604 and the node 603, as indicated by the crosses 631, 632. Since the communication system 600 implements loop detection based on RR in a route header of the IP packet, the node 601 incorporates an RR including a router address of the node 601 before transmitting the IP packet to the node 602. In response to receiving the IP packet from the node 601, the node 602 examines the RR and determines that its router address is not included in the RR. The node 602 detects the failure of the link to the node 603 and reroutes the received IP packet via its previously calculated alternate path to the next hop node 604. Prior to forwarding the IP packet, the node 602 appends its router address to the RR. In response to receiving the IP packet from the node 602, the node 604 examines the RR and determines that its router address is not included in the RR. The node 604 detects the failure of the link to the node 603 and reroutes the received packet via its previously calculated alternate path to the node 601. The node 601 examines the RR and determines that its router address is included in the RR and consequently the node 601 determines that the IP packet has traversed a loop through the communication system 600. The node 601 therefore drops the looping IP packet as indicated by the path 630.

Figure 7:
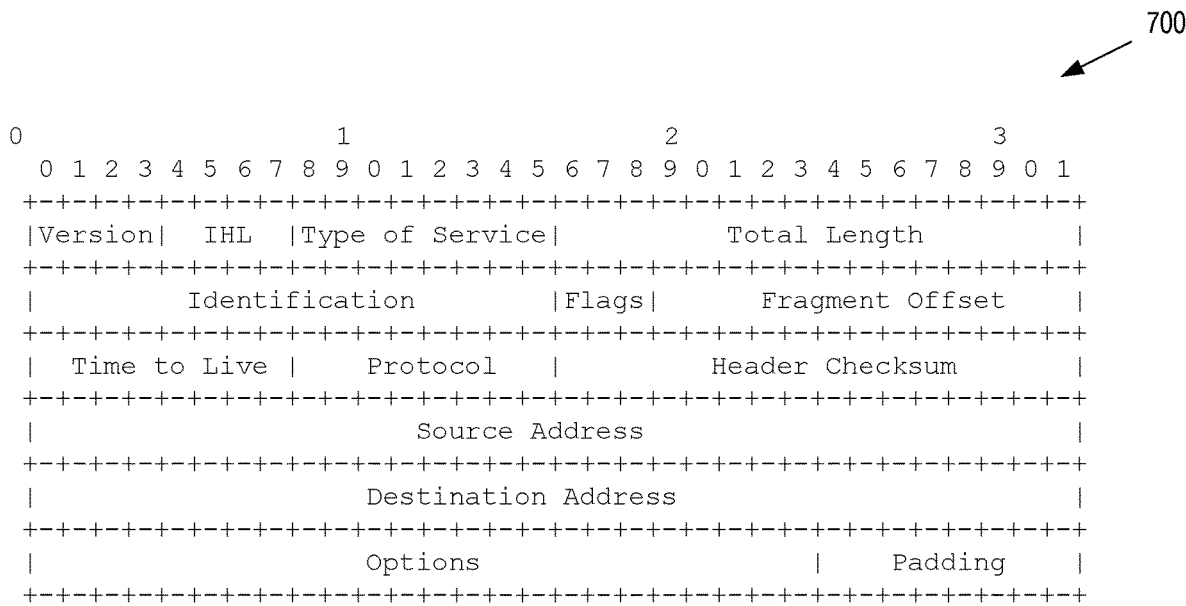
FIG. 7 is an IP header including an options field according to some embodiments.

FIG. 7 is an IPv4 header 700 including an options field according to some embodiments. The options field provides for control functions needed or useful in some situations but unnecessary for the most common communications. The options include provisions for timestamps, security, and special routing. The options field starts with a 1-octet type field followed by type specific encoding. Options are of variable length. Thus, minimum size of an Option field is 1-octet (Only type) if it does not have any type specific data. The maximum size of an Option field is limited by maximum permissible value of IHL field in IPV4 Header.

The 1-octet Type is viewed as having 3 fields:
1 bit copied flag,
2 bits option class,
5 bits option number.

The copied flag indicates that this option is copied into all fragments on fragmentation.
0=not copied
1=copied The option classes are:
0=control
1=reserved for future use
2=debugging and measurement
3=reserved for future use IPv4 protocols define the following IPv4 option which is called the Record Route (RR) Option.

COPY CLASS NUMBER LENGTH DESCRIPTION
----- ----- ------ ------ -----------
0 0 7 var. Record Route. Used to trace the route an IPv4 packet.

Figure 8:
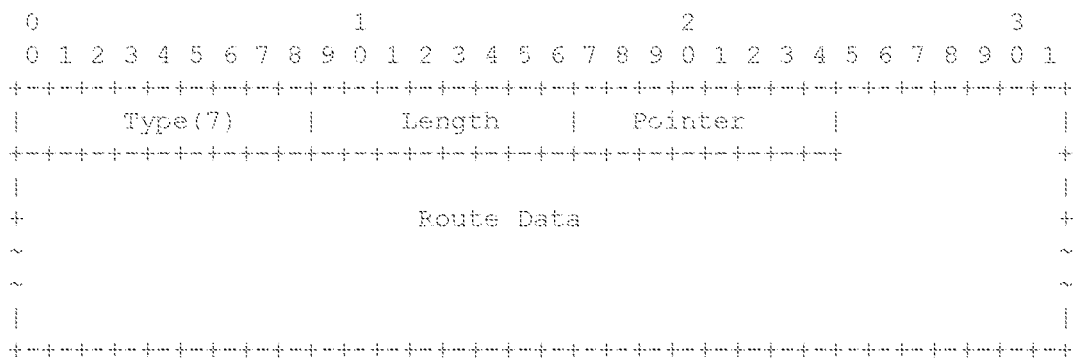
FIG. 8 is a format of a recorded route option field according to some embodiments.

FIG. 8 is a format 800 of a recorded route option field according to some embodiments. The format 800 is used for the option field in some embodiments of the IP header 700 shown in FIG. 7. The format 800 includes the following fields:

Type: 1-octet field that indicates RR Option in tuples of COPY, CLASS and NUMBER, which is 7.

Length: 1-octet field that indicates length of this option that includes Type octet, Length octet, the Pointer octet and octets of Route Data.

Pointer: 1-octet field that indicates the octet in Route Data which begins the next area to store a route address. The pointer is relative to this option, and the smallest legal value for the Pointer is 4, which points to the 4th Octet, i.e., the area immediately after the Pointer field.

Route Data: Composed of a series of IPv4 addresses where each address is 32 bits or 4 octets.

Figure 9:
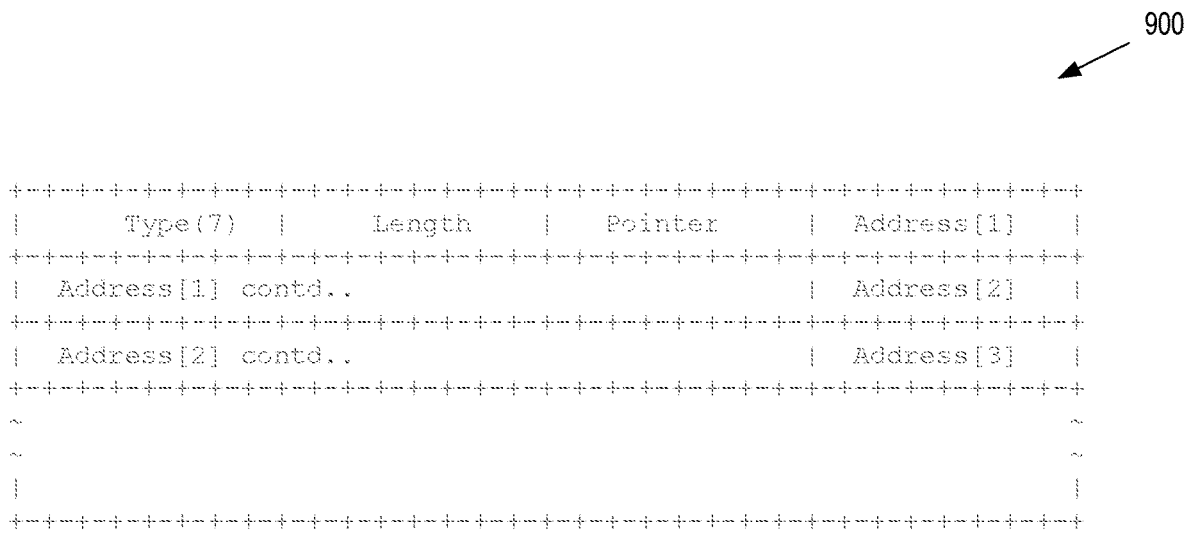
FIG. 9 is a detailed format of a recorded route option field according to some embodiments.

FIG. 9 is a detailed format 900 of a recorded route option field according to some embodiments. The detailed format 900 represents some embodiments of the format 800 shown in FIG. 8. The detailed format 900 includes a set of addresses that are represented as 32 bits or 4 octets.

If Pointer is greater than the Length in the detailed format 900, then the recorded route is considered as full and no more routes can be added. The originating host composes this option with a large enough route data area to hold the expected number of addresses. The size of the option does not change due to adding addresses. The initial contents of the route data area are zero.

When a router routes an IPv4 packet, the router checks to see if the record route option is present. If it is, the router inserts its own internet address as known in the environment into which this IPv4 packet is being forwarded into the recorded route beginning at the octet indicated by the pointer and increments the pointer by four.

If the route data area is already full (the pointer exceeds the length), the IPv4 packet is forwarded without inserting the address into the recorded route. If there is some room but not enough room for a full address to be inserted, the original IPv4 packet an error is declared and the IPv4 packet is discarded. In either case an ICMP parameter problem message may be sent to the source host.

The RR Option is not copied on fragmentation, goes in first fragment only.

The conventional RR Option suffers from the following issues that limit its applicability for loop detection:

Originator (source host) of the RR Option pre-allocates enough route data area to hold all the address expected. Typically, when source host inserts the RR Option, it is aware of the complete path to be traversed by the packet, which it may have discovered by other means. But a transit router may not have an idea of the complete path while forwarding the packet in data plane using routing table. So, the router may have to insert the RR Option with maximum possible size, which is a significant waste of space (overhead) in the packet for loop detection purposes. For loop detection purposes, the originating router should be inserting an empty RR that would grow as the packet traverses along the path.

RR Option is not copied on fragmentation, whereas for loop detection the RR option needs to be copied to every fragment If route data area is full then ICMP parameter problem may be sent to the source host which originated the IP packet (and included RR Option). However, for loop detection purposes, RR option is inserted by a router in the path of the packet, so sending ICMP message to the source host is not correct.

Some embodiments of IP headers therefore support a new IPv4 Option that is referred to as an "Extended Record Route (ERR)" Option. The ERR Option is generic and can be used for loop detection techniques and functions performed by the conventional RR Option.

The type field of ERR is assigned the following values:

COPY CLASS NUMBER LENGTH DESCRIPTION
----- ----- ------ ------ -----------
1 0 31 var. Extended Record Route. Used to trace the route an IPv4 packet as well detect loops.

The option number is assigned value 3. Copy bit is 1, which means that the ERR option is copied into all fragments, in case the IPv4 packet carrying the option is fragmented by a router.

Figure 10:
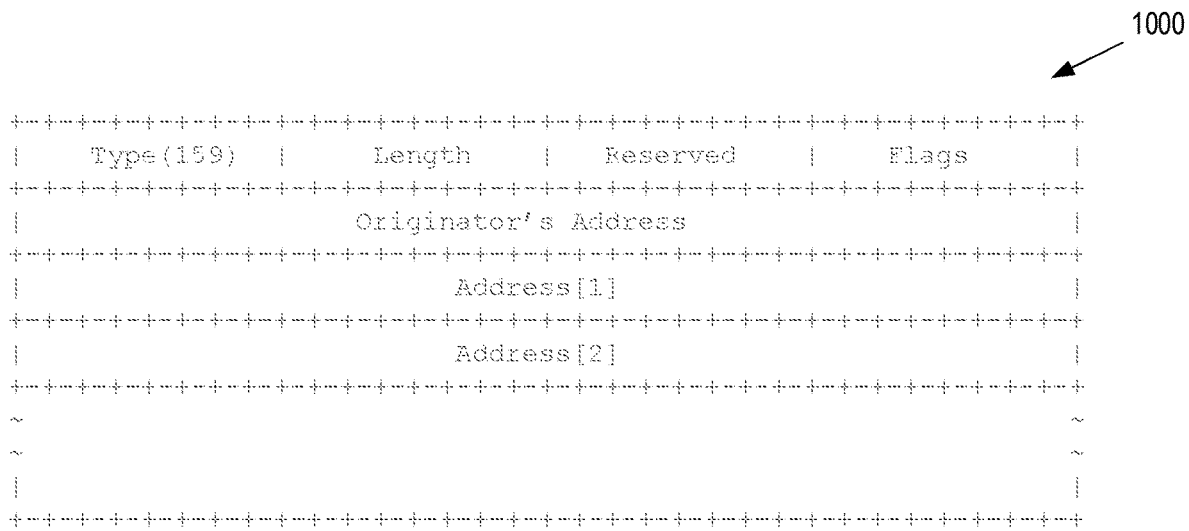
FIG. 10 is a detailed format of an extended recorded route option (ERR) according to some embodiments.

FIG. 10 is a detailed format 1000 of an extended recorded route option (ERR) according to some embodiments. The detailed format 1000 is used in some embodiments of the IP headers 700 shown in FIG. 7. The detailed format 1000 includes the following fields:

Type: 1-octet field that indicates RR Option in tuples of COPY, CLASS and NUMBER, which is 159.

Length: 1-octet field that indicates length of this option that includes Type octet, Length octet, the Pointer octet, Flags octet, Originator's Address octets and octets of Route Data.

Reserved: 1-octet field reserved for future use. Sender sets this field as 0 and receiver should ignore this field.

Figure 11:
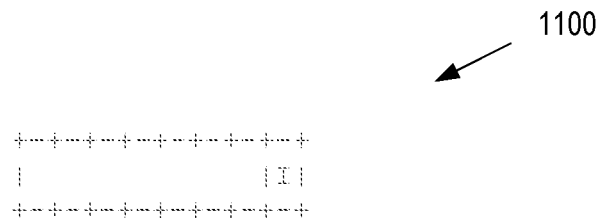
FIG. 11 is a 1-octet field that is used to carry flags in an ERR according to some embodiments.

Flags: 1-octet field carries various flags, as illustrated in FIG. 11.

Originator's Address: The originator of the ERR option. If originated by source host for recording routes along the path, then this field encodes the source IP address of the packet. If originated by a router for loop detection techniques described herein, then this field encodes the IP address of the router.

Route Data: It is composed of a series of IPv4 addresses where each address is 32 bits or 4 octets.

The originator of ERR option starts with its address as only entry in route data. The size of the option changes as subsequent routers add their own addresses.

When a router routes an IPv4 packet, it checks to see if the ERR option is present. If it is, it checks if its own IPv4 address is present in the ERR. If present, then a loop is detected, and the router performs actions such as notification of loop before dropping the packet. Otherwise, the router makes room for its own IPv4 address at the end of ERR (indicated by the Length field), inserts its address and increments the Length by four.

FIG. 11 is a 1-octet field 1100 that is used to carry flags in an ERR according to some embodiments. The 1-octet field 1100 includes following bits:

I-bit: If set to 1, then indicates if ICMP message needs to be sent to the originator (Originator's Address) if the ERR Option reached its maximum possible length.

Rest of the bits are set to 0 by sender and are ignored by receivers.

The Internet Header Length (IHL) field in an IPV4 header has 4 bits, which represents the number of 32-bit words on the IPv4 header, including variable number of IPv4 options. As a 4-bit field the maximum value is 15 words (15×32 bits, or 480 bits=60 bytes). The minimum value of IHL is 5 which indicates length of 5×32=160 bits=20 bytes, i.e. the fixed size of IPV4 header excluding the options. This means max size of options can be 60−20=40 bytes, which limits the size of ERR Option to 40 bytes although the Length field of ERR option allows up to 255 bytes. So, the maximum number of IPv4 addresses that can be included within Route Data of ERR Option is (40−8)/4=8. Thus, some embodiments of the ERR cannot be used for loop detection if the number of hops traversed by an IP packet in a network is more than 8.

Figure 12:
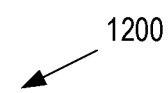
FIG. 12 is a block diagram of a protocol stack that includes an IP shim layer according to some embodiments.

FIG. 12 is a block diagram of a protocol stack 1200 that includes an IP shim layer 1205 according to some embodiments. The IP shim layer 1205 is implemented between a transport protocol layer 1210 and an IP layer 1215. The IP shim layer 1205 is carried using an IP protocol number that is included in an IP header and can be reserved from existing protocol number registries, e.g., the protocol number "145" can be reserved from a registry maintained by IANA. The only router that is allowed to inspect the IP shim header associated with the IP shim layer 1205 is the router corresponding to a destination address of the packet or, if a router alert option is set in the IP header.

Figure 13:
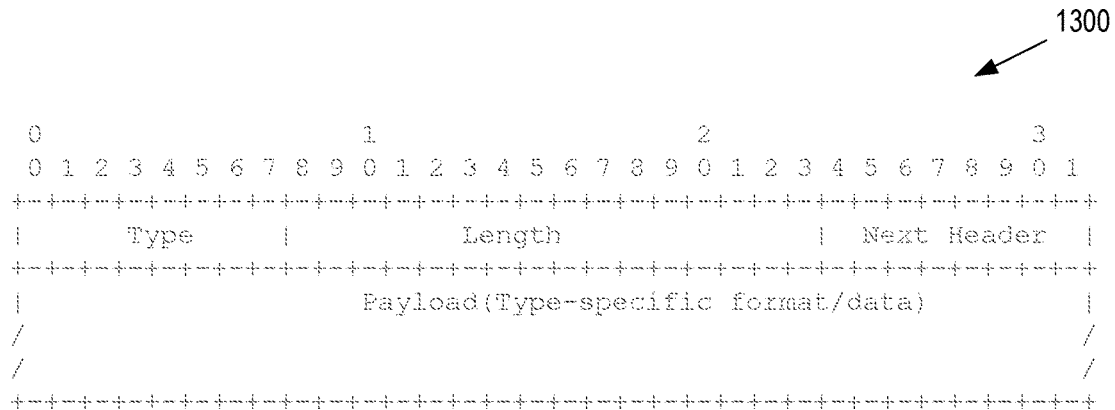
FIG. 13 is a format of an IP shim header according to some embodiments.

FIG. 13 is a format 1300 of an IP shim header according to some embodiments. The format 1300 is used to implement some embodiments of the IP shim header associated with the IP shim layer 1205 shown in FIG. 12. The format 1300 includes the following fields:

Type: The IP-Shim Protocol is defined as generic and may carry different types within it. This 8-bit field carries the type including a new type:

Type 8=IPv4-Record-Route (IPv4-RR)

Types 1-7 are reserved by various other techniques that use IP-Shim Headers. In the following, the phrase "IPv4-RR-Shim Header" refers to the IP-Shim Header Type 8.

Length: This 16-bit field carries length of the payload in octets. The octets of Type, Length and Next Header fields are excluded.

Next Header: IP Protocol type of the header next to the IP-Shim Header, i.e. TCP, UDP, ICMP etc.

Payload: The payload contains the type specific format. The payload format for Type 8 is illustrated in FIG. 14.

Figure 14:
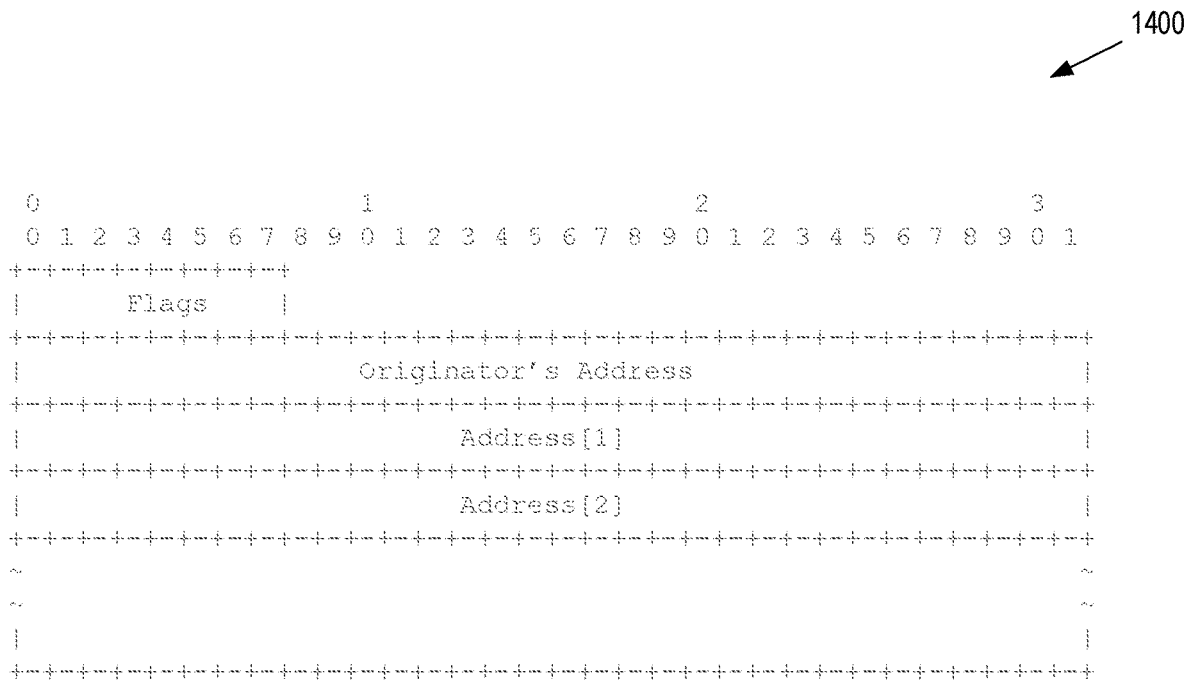
FIG. 14 is a payload of an IP shim header according to some embodiments.

FIG. 14 is a payload 1400 of an IP shim header of type IPv4-RR according to some embodiments. The payload 1400 is included in some embodiments of the format 1300 shown in FIG. 13. The payload 1400 includes the following fields:

Flags: 1-octet field carries various flags. Some embodiments are illustrated in FIG. 15.

Originator's Address: The originator of the IPv4-RR-Shim header. If originated by source host for recording routes along the path, then this field encodes the source IP address of the packet. If originated by a router for loop detection techniques, then this field encodes the IP address of the originating router.

Route Data: Composed of a series of IPv4 addresses where each address is 32 bits or 4 octets.

The originator of IPv4-RR-Shim starts with its router address as the only entry in route data. The size of the route data changes as subsequent routers add their own addresses. The originator also inserts Router Alert Option so that every router inspects the IPv4-RR-Shim Header.

When a router routes an IPv4 packet that includes router alert, then the router checks to see if IPv4-RR-Shim Header is present. If the IP shim header is present, the router checks if its own IPv4 address is present in the route data. If present, then a loop is detected, and the router performs actions such as notification of loop before dropping the packet. Otherwise, the router makes room for its own IPv4 address at the end of the route data and appends its address.

Although IPv4-RR-Shim header can grow to very large size (because length field in IPv4-RR-Shim header is 2 octets), in practice the number of routing hops in internet does not go beyond 32. So, routers in a network may impose a configured limit on maximum number of addresses in IPv4-RR-Shim, such as to 64. If the number of addresses reaches the maximum size, the IPv4 packet is forwarded without inserting the address into the IPv4-RR-Shim. In that case, if I-bit is set, then router may send ICMP parameter problem message to the Originator's Address indicating "size of IPv4-RR-Shim exceeded".

FIG. 15 is a 1-octet field 1500 that is used to carry flags in an IP shim header according to some embodiments. The 1-octet field 1500 includes following bits:

I-bit: If set to 1, then indicates if ICMP message needs to be sent to the originator (Originator's Address) if the IPv4-RR-Shim reached its maximum possible length.

Rest of the bits are set to 0 by sender and are ignored by receivers.

Figure 16:
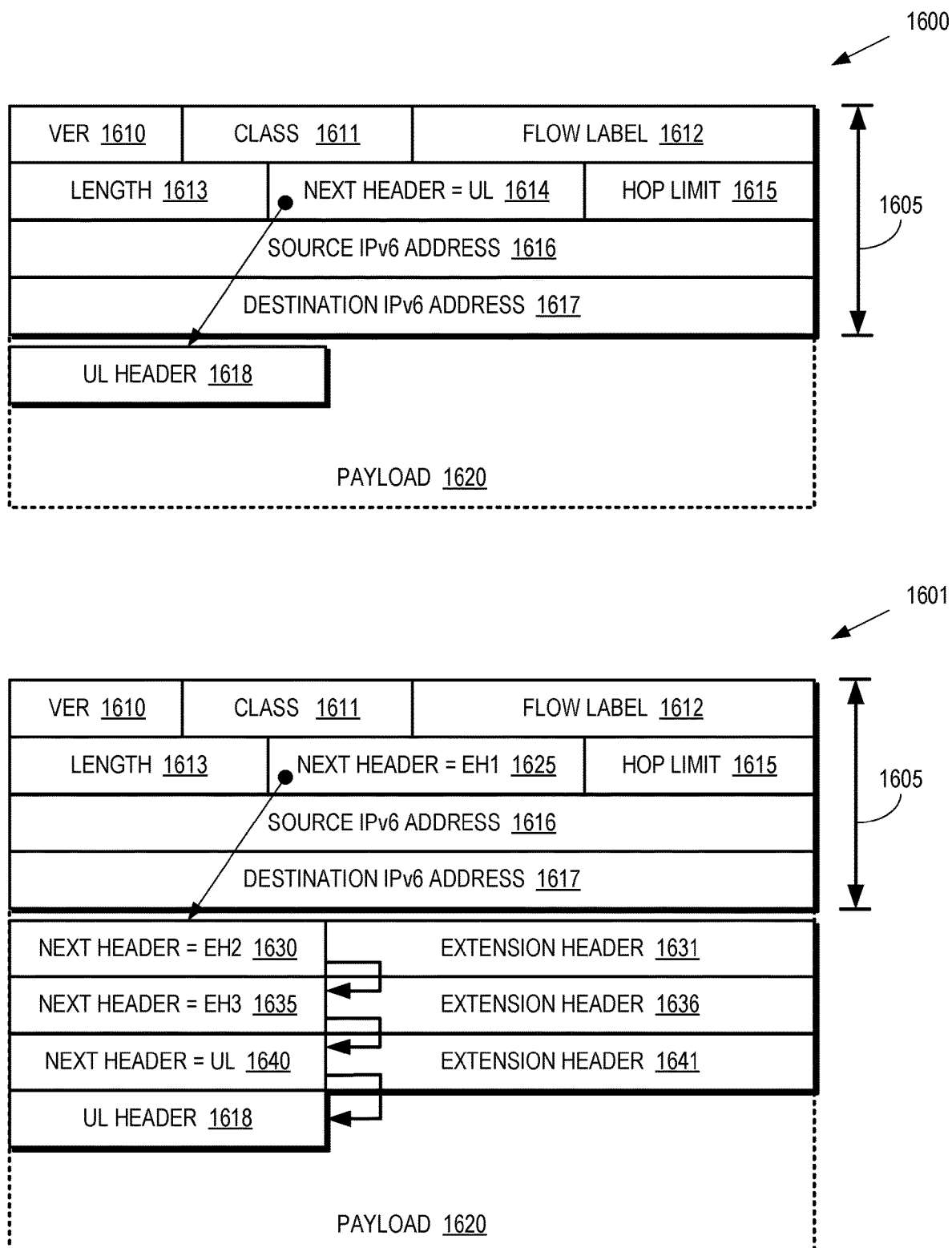
FIG. 16 illustrates IPv6 headers that include header extensions such as a header extension that conveys ERR according to some embodiments.

FIG. 16 illustrates IPv6 headers 1600, 1601 that include header extensions such as a header extension that conveys ERR according to some embodiments. The IPv6 header 1600 is included in packets transmitted in some embodiments of the communication system 600 shown in FIG. 6. The IPv6 headers 1600, 1601 include a first portion 1605 made up of a set of fields including a version field 1610, a class field 1611, a flow label 1612, a length 1613, a next header field 1614, a hop limit 1615, a source address 1616, and a destination address 1617. The next header field 1614 includes information (such as a pointer) to an additional header such as an upper layer header 1618. Examples of upper layer headers are transport protocol headers such as TCP, UDP, SCTP, etc. The IPv6 headers 1600, 1601 are prepended to a corresponding payload 1620 to form an IPv6 packet.

The first portion 1605 of the IPv6 header remains fixed in size (e.g., 40 bytes) and extension headers are added to provide for control functions in some embodiments. For example, extension headers can be used for timestamps, security, and special routing. In the illustrated embodiment, the next header field 1625 includes information (such as a pointer) indicating another next header field 1630 that is associated with extension header 1631. The next header field 1630 includes information (such as a pointer) indicating a subsequent next header field 1635 that is associated with extension header 1636. The next header field 1635 includes information (such as a pointer) indicating a subsequent next header field 1640 that is associated with extension header 1641. The next header field 1640 includes information (such as a pointer) to the upper layer header 1618. Although four next header fields 1625, 1630, 1635, 1640 are shown in FIG. 16, some embodiments of the IPv6 header 1600 include more or fewer next header fields.

Some embodiments of the extension headers 1631, 1636, 1641 are implemented as "hop-by-hop options headers" that carry optional information that is examined by every router along a delivery path of the packet. This type of extension header is identified by a value of 0 in an IP headers next header field and the extension header is generic to support definitions of multiple options within the extension header. Special directives that are to be examined by every transit router of an IP packet are defined as an option within the hop-by-hop options header.

FIG. 17 is a hop-by-hop options header 1700 according to some embodiments. The hop-by-hop options header 1700 is used in some embodiments of the extension headers 1631, 1636, 1641 shown in FIG. 16. The hop-by-hop options header 1700 includes the following fields:

Next Header 8-bit selector. Identifies the type of header immediately following the Hop-by-Hop Options header.

Hdr Ext Len 8-bit unsigned integer. Length of the Hop-by-Hop Options header in 8-octet units, not including the first 8 octets.

Options Variable-length field, of length such that the complete Hop-by-Hop Options header is an integer multiple of 8 octets long. Contains one or more TLV-encoded options. The TLV encoded options are described in FIG. 18.

FIG. 18 is a type-length-value (TLV) encoded option field 1800 according to some embodiments. The TLV encoded option field 1800 is used in some embodiments of the hop-by-hop options header 1700 shown in FIG. 17. The TLV encoded option field 1800 includes the following fields:

Option Type 8-bit identifier of the type of option.

Opt Data Len 8-bit unsigned integer. Length of the Option Data field of this option, in octets.

Option Data Variable-length field. Option-Type-specific data.

The sequence of options within a header is processed in the order they appear in the header. For example, a receiver does not scan through the header looking for a particular kind of option and process that option prior to processing preceding ones.

The Option Type identifiers are internally encoded such that their highest-order two bits specify the action that is taken if the processing IPv6 node does not recognize the Option Type:

00—skip over this option and continue processing the header.

01—discard the packet.

10—discard the packet and, regardless of whether or not the packet's Destination Address was a multicast address, send an ICMP Parameter Problem, Code 2, message to the packet's Source Address, pointing to the unrecognized Option Type.

11—discard the packet and, only if the packet's Destination Address was not a multicast address, send an ICMP Parameter Problem, Code 2, message to the packet's Source Address, pointing to the unrecognized Option Type.

The third highest order bit of the Option Type specifies whether the Option Data of that option can change while the packet is inflated to the packet's final destination. When an Authentication header (another type of EH that carries authentication digest of the packet) is present in the packet, for any option whose data may change in flight, its entire Option Data field is treated as zero-valued octets when computing or verifying the packet's authenticating digest.

0—Option Data does not change in flight

1—Option Data may change in flight

The three high-order bits described above are to be treated as part of the Option Type, not independent of the Option Type. That is, a particular option is identified by a full 8-bit Option Type, not just the low-order 5 bits of an Option Type.

FIG. 19 is a record route (RR) option 1900 for a hop-by-hop options header according to some embodiments. The format of the RR option 1900 includes the following fields:

Option Type: This field encodes the option type that indicates it as RR option. The highest-order 2-bits are encoded with the following value.

00—skip over this option and continue processing the header, which means that if a receiver does not recognize the RR option then it should ignore the RR option.

The 3rd highest order bit is encoded with the following value.

1—Option Data may change while the packet is in flight, because content of RR changes at every hop/router. The remaining 5-bits are assigned the value 10010. This results in the value of Option Type field as 0×32.

Opt Data Len: The value of this field is variable and indicates the length of remaining bytes in the RR option.

Reserved: 1-octet field that is reserved for future use. Sender sets this field as 0 and receiver ignores this field.

Flags: 1-octet field carries various flags including the set of bits 1905 that are defined as follows:

I-bit: If set to 1, then indicates if ICMP message needs to be sent to the originator (Originator's Address) if the RR Option reached its maximum possible length. Rest of the bits are set to 0 by sender and are ignored by receivers.

Originator's Address: The originator of the RR in the IPv6 packet. If originated by source host for recording routes along the path, then this field encodes the source IPv6 address of the packet. If originated by a router for loop detection techniques as disclosed herein, then this field encodes the IPv6 address of the originating router.

Route Data: It is composed of a series of IPv6 addresses where each address is 128 bits or 16 octets.

The originator of RR option starts with its address as only entry in route data. The size of the option changes as subsequent routers add their own addresses.

When a router routes an IPv6 packet that includes a Hop-by-Hop Options Header, it checks to see if the RR option is present within the Header. If it is present, then it checks if its own IPv6 address is present in the RR option. If present, then a loop is detected, and it performs actions as described herein, such as notification of loop, before dropping the packet. Otherwise, it appends its own IPv6 address into the Route Data and increments the Opt Data Len by 16.

If the route data reaches the maximum size, i.e Opt Data Len reaches its maximum value such that no more IPv6 address can be appended to route data, then IPv6 packet is forwarded without inserting the IPv6 address of the router. In that case, if I-bit is set, then router may send ICMPv6 parameter problem message to the Originator's Address.

As discussed above, the size of the Opt Data Len field in an option in Hop-by-Hop Options Header is 1-octet, which allows its maximum size to be 255 bytes. This means the max size of Route Data for RR Option can be 255-2 (Reserved+Flags)−16 (Originator's Address)=237 bytes. So, the maximum number of IPv6 addresses that can be included within Route Data of RR Option is 237/16=14, which means the RR option can't be used for loop detection if the number of hops traversed by an IP packet in a network is more than 14. Therefore, in some embodiments, the RR is encoded in IPv6 packets by using the IP Shim Layer, such as the IP shim layer 1205 shown in FIG. 12. In some embodiments, a type of the IP Shim header generated by the IP Shim layer is defined as:

Type 9=IPv6-Record-Route (IPv6-RR).

In the following, the term "IPv6-RR-Shim Header" refers to the IP-Shim Header Type 9.

FIG. 20 is a format 2000 for a payload of Type 9 according to some embodiments. The format 2000 includes the following fields:

Flags: 1-octet field carries various flags that are represented as a set of bits 2005, which are defined as follows:

I-bit: If set to 1, then indicates if ICMPv6 message needs to be sent to the originator (Originator's Address) if the IPv6-RR-Shim reached its maximum possible length. Rest of the bits are set to 0 by sender and are ignored by receivers.

Originator's Address: The originator of the IPv6-RR-Shim. If originated by source host for recording routes along the path, then this field encodes the source IPv6 address of the packet. If originated by a router for loop detection as disclosed herein, then this field encodes the IP address of the originating router.

Route Data: It is composed of a series of IPv6 addresses where each address is 128 bits or 16 octets.

The originator of IPv6-RR-Shim starts with its address as the only entry in route data. The size of the route data changes as subsequent routers add their own addresses. In some embodiments, the originator also inserts IPv6 Router Alert Option so that every router inspects the IPv6-RR-Shim Header.

When a router routes an IPv6 packet that includes IPv6 router alert, then the router checks to see if IPv6-RR-Shim Header is present. If the IP Shim header is present, the router checks if its own IPv6 address is present in the route data. If present, then a loop is detected, and the router performs actions such as notification of loop before dropping the packet. Otherwise, the router makes room for its own IPv6 address at the end of the route data and appends its address.

Although IPv6-RR-Shim can grow to very large size (because length field in IPv6-RR-Shim header is 2 octets), practically number of routing hops in internet does not go beyond 32. So, routers in a network may impose a configured limit on maximum number of addresses in IPv6-RR-Shim, such as to 64. If the number of addresses reaches the maximum size, the IPv6 packet is forwarded without inserting the address into the IPv6-RR-Shim. In that case, if I-bit is set, then router may send ICMPv6 parameter problem message to the Originator's Address.

Figure 21:
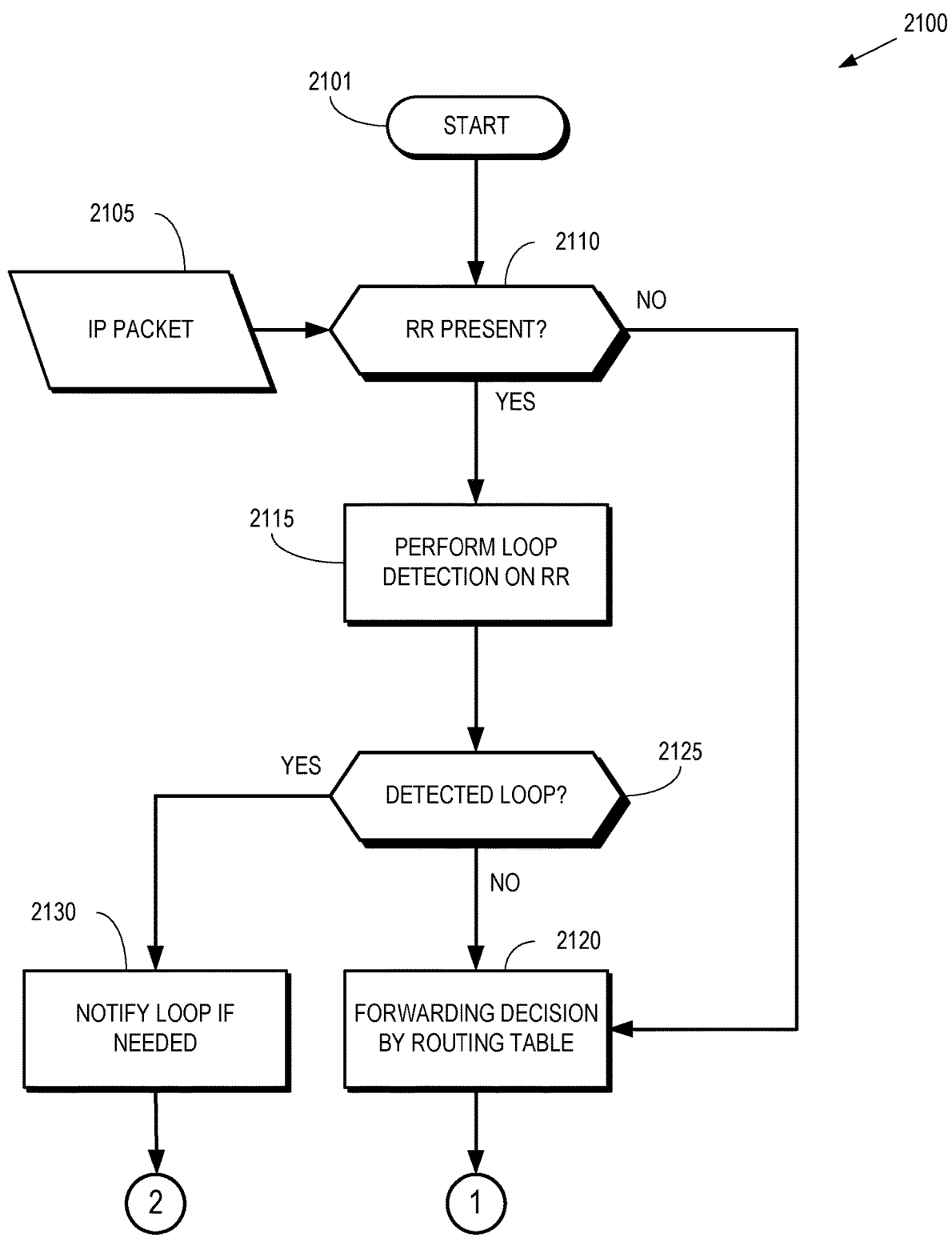
FIG. 21 is a flow diagram of a first portion of a method of processing an IP packet at a node according to some embodiments.

FIG. 21 is a flow diagram of a first portion of a method 2100 of processing an IP packet at a node according to some embodiments. The method 2100 is implemented by the nodes in some embodiments of the communication system 600 shown in FIG. 6.

The method 2100 begins at block 2101. At the input block 2105, the node receives an IP packet.

At decision block 2110, the node determines whether an RR is present in the IP packet. If the node detects an RR in the IP packet, the method 2100 flows to block 2115. Otherwise, the method 2100 flows to block 2120.

At block 2115, the node performs loop detection based on the received RR. At decision block 2125, the node determines whether a loop is been detected. If a loop has been detected, the method 2100 flows to the block 2130. Otherwise, the method 2100 flows to the block 2120.

At block 2120, the node looks up the destination address of the IP packet in the IP routing table. The method 2100 then flows to the node 1, which connects to some embodiments of the decision block 2205 in FIG. 22.

At block 2130, the node determines whether notification of the detected loop should be performed and, if so, the node generates a notification for the loop. The method 2100 then flows to the node 2, which connects to some embodiments of the block 2210 in FIG. 22.

Figure 22:
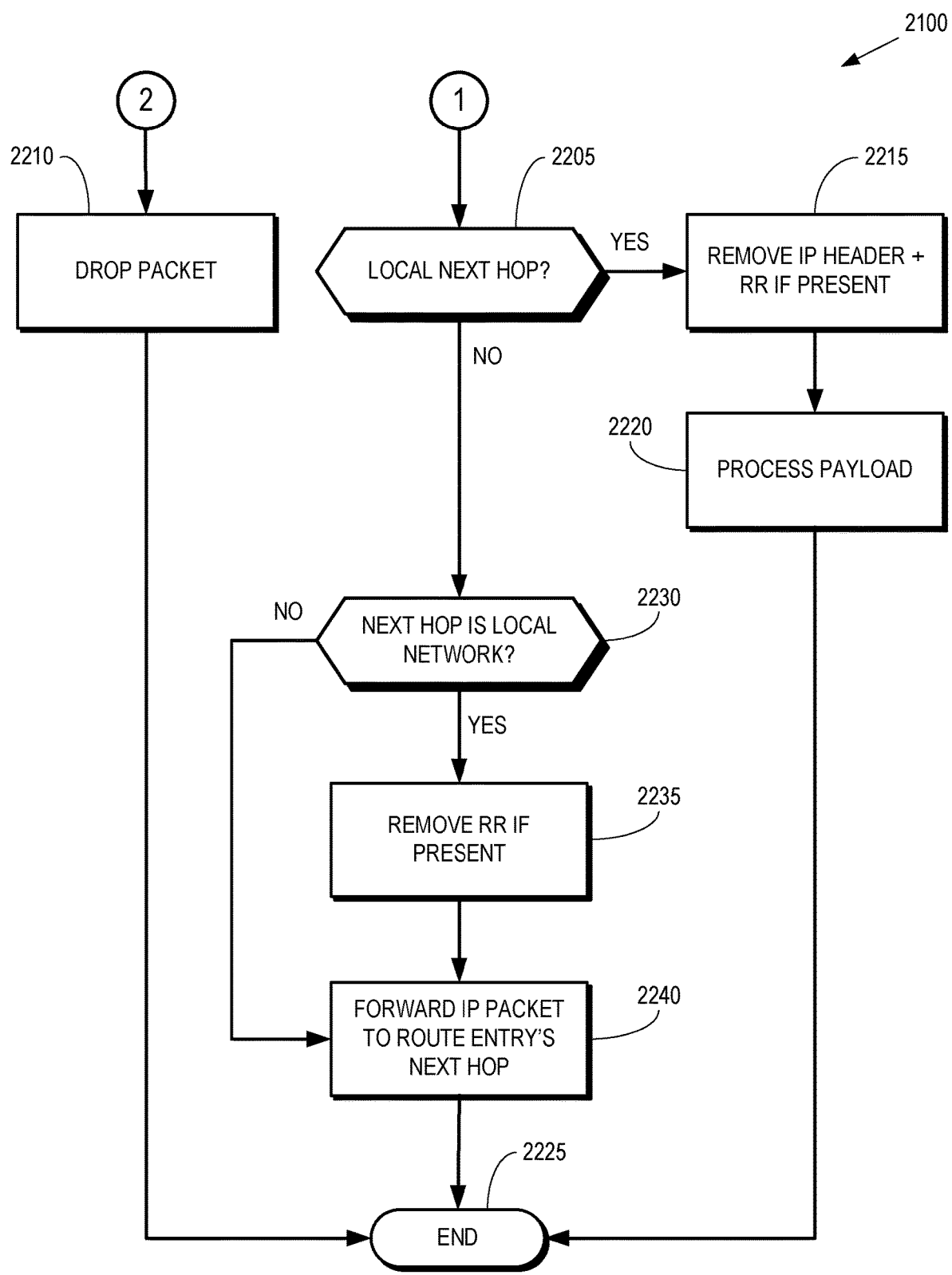
FIG. 22 is a flow diagram of a second portion of the method of processing an IP packet at a node according to some embodiments.

FIG. 22 is a flow diagram of a second portion of the method 2100 of processing an IP packet at a node according to some embodiments. Node 1 connects the decision block 2205 to block 2120 in FIG. 21. Node 2 connects the block 2210 to the block 2130 in FIG. 21.

At decision block 2205, the node determines whether the next hop of the node indicates that the destination address belongs to the node. If so, the method 2100 flows to the block 2215. The node removes the IP header and, if present, the RR at block 2215 and processes the payload at the block 2220. The method 2100 then flows to block 2225 and the method 2100 ends. If the next hop of the node indicates that the destination address does not belong to the node, the method 2100 flows to the decision block 2230.

At decision block 2230, the node determines whether the next hop is a local network, which would be the case if the destination IP address is included in a subnet assigned to a locally connected network. If the next hop is a local network, the method flows to the block 2235 and the node removes the RR (if present) from the packet. The method 2100 then flows to the block 2240. If the next hop is not a local network, the method 2100 bypasses the block 2235 and flows directly to the block 2240. At block 2240, the node forwards the packet to the next hop of the router. The method 2100 then ends at the block 2225.

Figure 23:
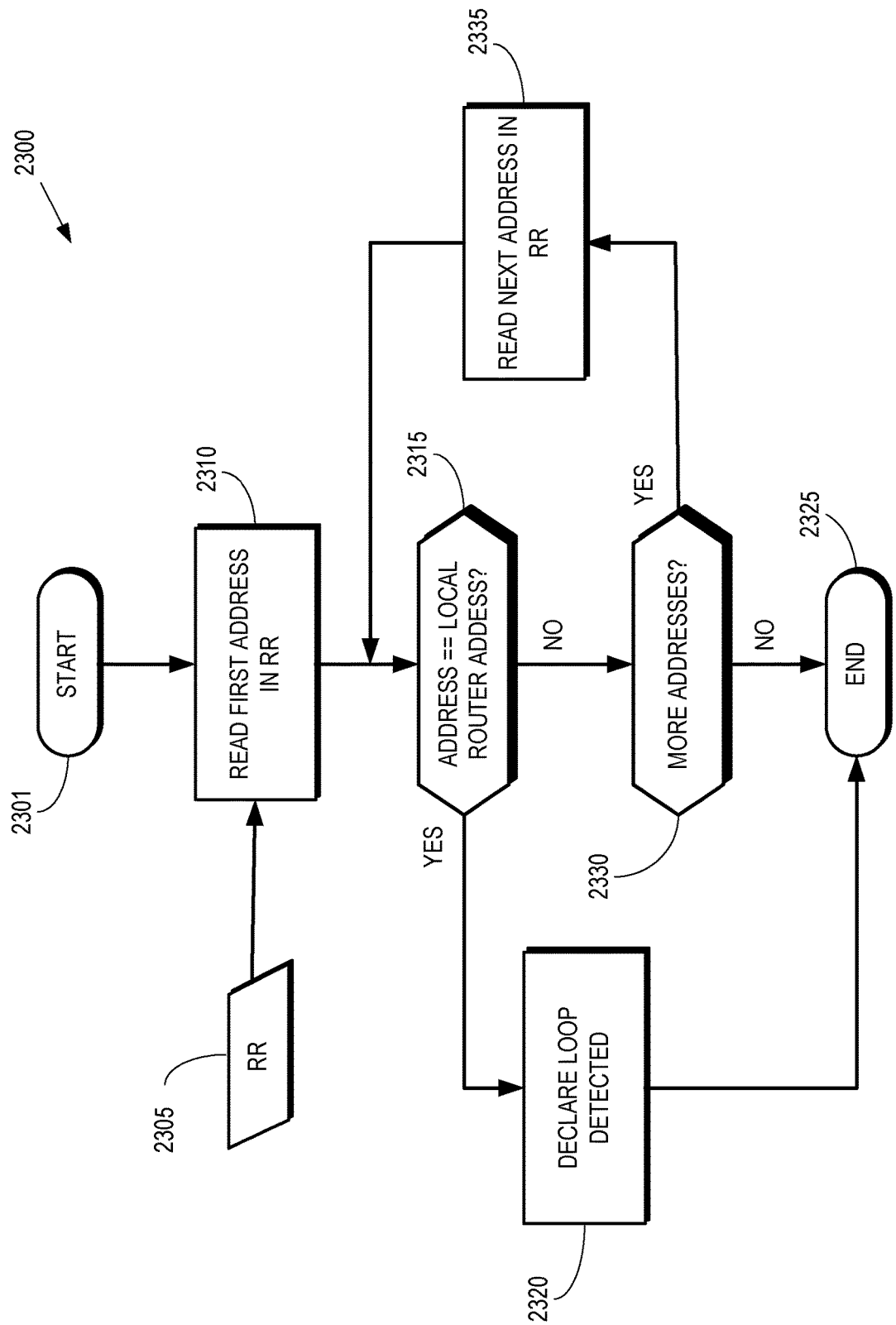
FIG. 23 is a flow diagram of a method of performing loop detection on an IP packet at a node according to some embodiments.

FIG. 23 is a flow diagram of a method 2300 of performing loop detection on an IP packet at a node according to some embodiments. The method 2300 is implemented by the nodes in some embodiments of the communication system 600 shown in FIG. 6. The method 2300 is also used to implement some embodiments of the block 2115 shown in FIG. 21.

The method 2300 begins at block 2301. At the input block 2305, the node receives an RR that is included in a header of an IP packet.

At block 2310, the node reads the first address in the RR. At decision block 2315, the node determines whether the address matches the router address configured in the node. If so, the method 2300 flows to the block 2320 and the node declares that a loop has been detected in the RR. The method 2300 then flows to the block 2325 and the method 2300 ends. If the address does not match the router address, the method 2300 flows to decision block 2330.

At decision block 2330, the node determines whether there are additional addresses in the RR. If so, the method 2300 flows to the block 2335 and the node reads the next address in the RR. The method 2300 then flows to the decision block 2315. If there are no additional addresses in the RR, the method 2300 flows to the block 2325 and the method 2300 ends.

Figure 24:
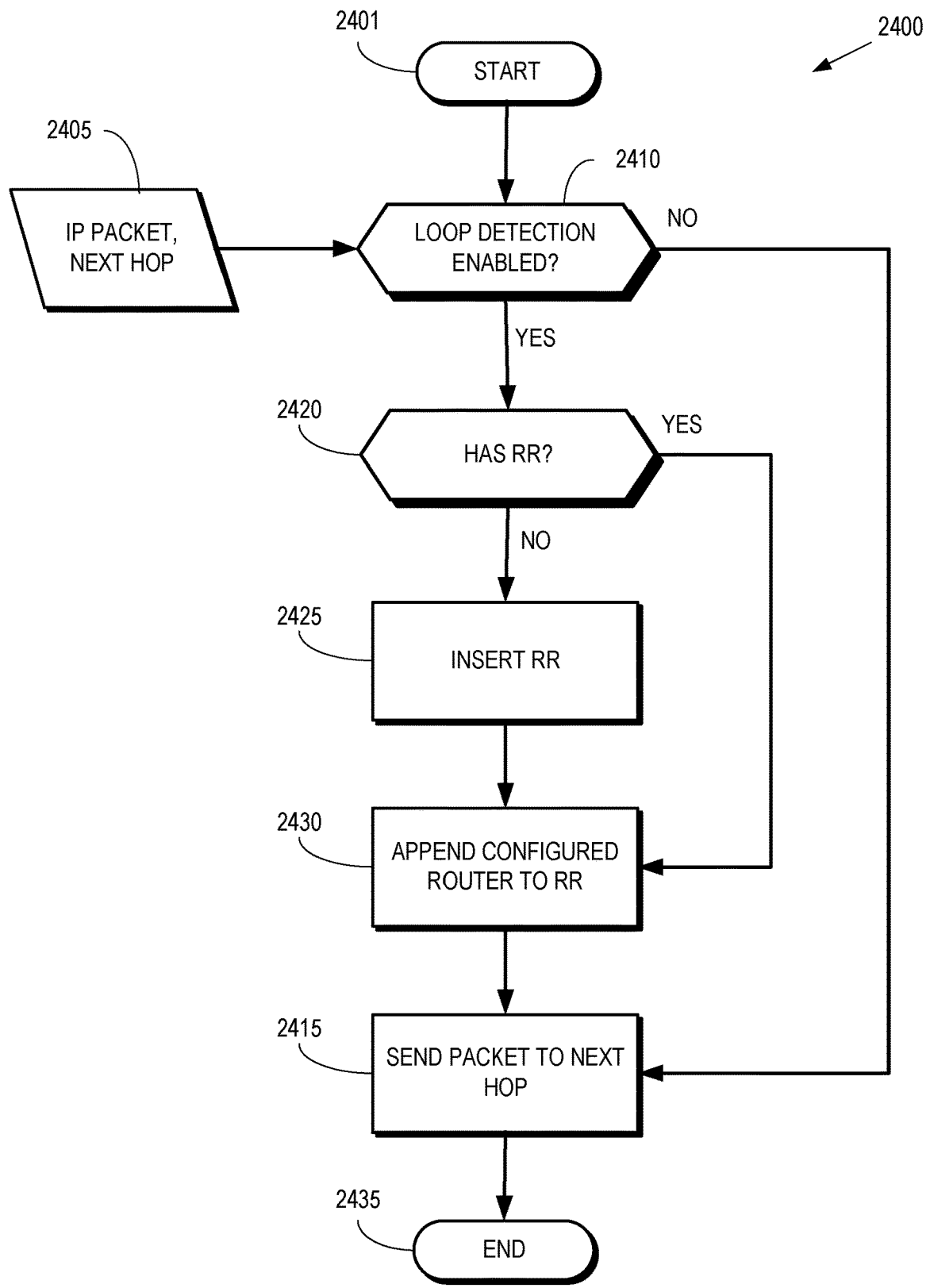
FIG. 24 is a flow diagram of a method of forwarding an IP packet to a next hop on a route from a node according to some embodiments.

FIG. 24 is a flow diagram of a method 2400 of forwarding an IP packet to a next hop on a route from a node according to some embodiments. The method 2400 is implemented by the nodes in some embodiments of the communication system 600 shown in FIG. 6. The method 2400 is also used to implement some embodiments of the block 2240 shown in FIG. 22.

The method 2400 begins at block 2401. At the input block 2405, the node receives an IP packet and information indicating the next hop of the IP packet. The node forwards the IP packet to the next hop as follows.

At decision block 2410, the node determines whether loop detection is enabled. The criteria for determining whether loop detection is enabled includes determining whether loop detection is required by default, determining whether loop detection is required during fast rerouting and whether the next hop is the backup next hop, determining whether loop detection is required for test packets or OAM packets and whether the IP (or MPLS) packet is an OAM packet. Other criteria for determining whether loop detection is enabled are implemented in some embodiments. If loop detection is not enabled, the method 2400 flows to the block 2415. If loop detection is enabled, the method 2400 flows to the decision block 2420.

At decision block 2420, the node determines whether an RR is already included in the IP packet. If not, the method 2400 flows to the block 2425. Otherwise, if an RR is already included in the IP packet, the method 2400 flows to the block 2430 and bypasses the block 2425.

At block 2425, the node inserts an RR into the IP packet. At block 2430, the node appends the router address configured for the node to the RR in the IP packet. The method 2400 then flows to the block 2415.

At block 2415, the node sends the IP packet to the next hop. The method 2400 then ends at block 2435.

Figure 25:
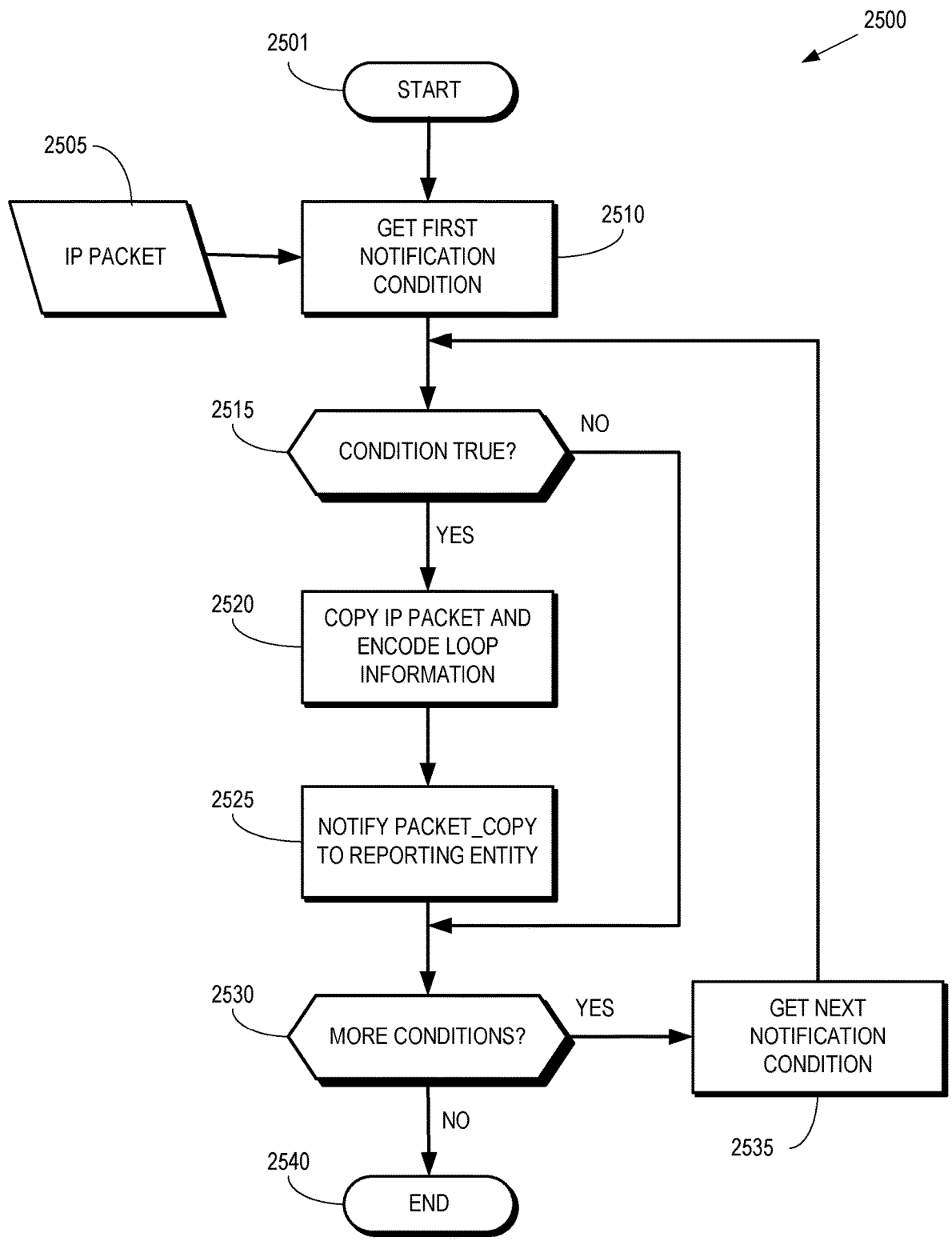
FIG. 25 is a flow diagram of a method of sending a notification in response to detecting a loop at a node according to some embodiments.

FIG. 25 is a flow diagram of a method 2500 of sending a notification in response to detecting a loop at a node according to some embodiments. The method 2500 is implemented by the nodes in some embodiments of the communication system 600 shown in FIG. 6. The method 2500 is also used to implement some embodiments of the block 2130 shown in FIG. 21.

The method 2500 begins at block 2501. At the input block 2505, the node receives the IP packet that has been detected in a loop.

At block 2510, the node retrieves a first condition for notification of the loop. At decision block 2515, the node determines whether the condition for notification of the loop is true, e.g., the notification condition is met by the IP packet. If the condition is true, the method 2500 flows to the block 2520. If the condition is not true, the method 2500 flows to the decision block 2530.

At block 2520, the node makes a copy of the IP packet and encodes the loop information into the packet. At block 2525, the node notifies the copy of the IP packet to the reporting entity associated with the condition, e.g., by transmitting the copy of the IP packet to the reporting entity.

At decision block 2530, the node determines whether there are more conditions for notifying the detected loop. If so, the method 2500 flows to the block 2535 and the node retrieves the next notification condition. The method 2500 then flows to the decision block 2515. If no more conditions are found for notifying the detected loop, the method 2500 flows to the block 2540 and the method 2500 ends.

Figure 26:
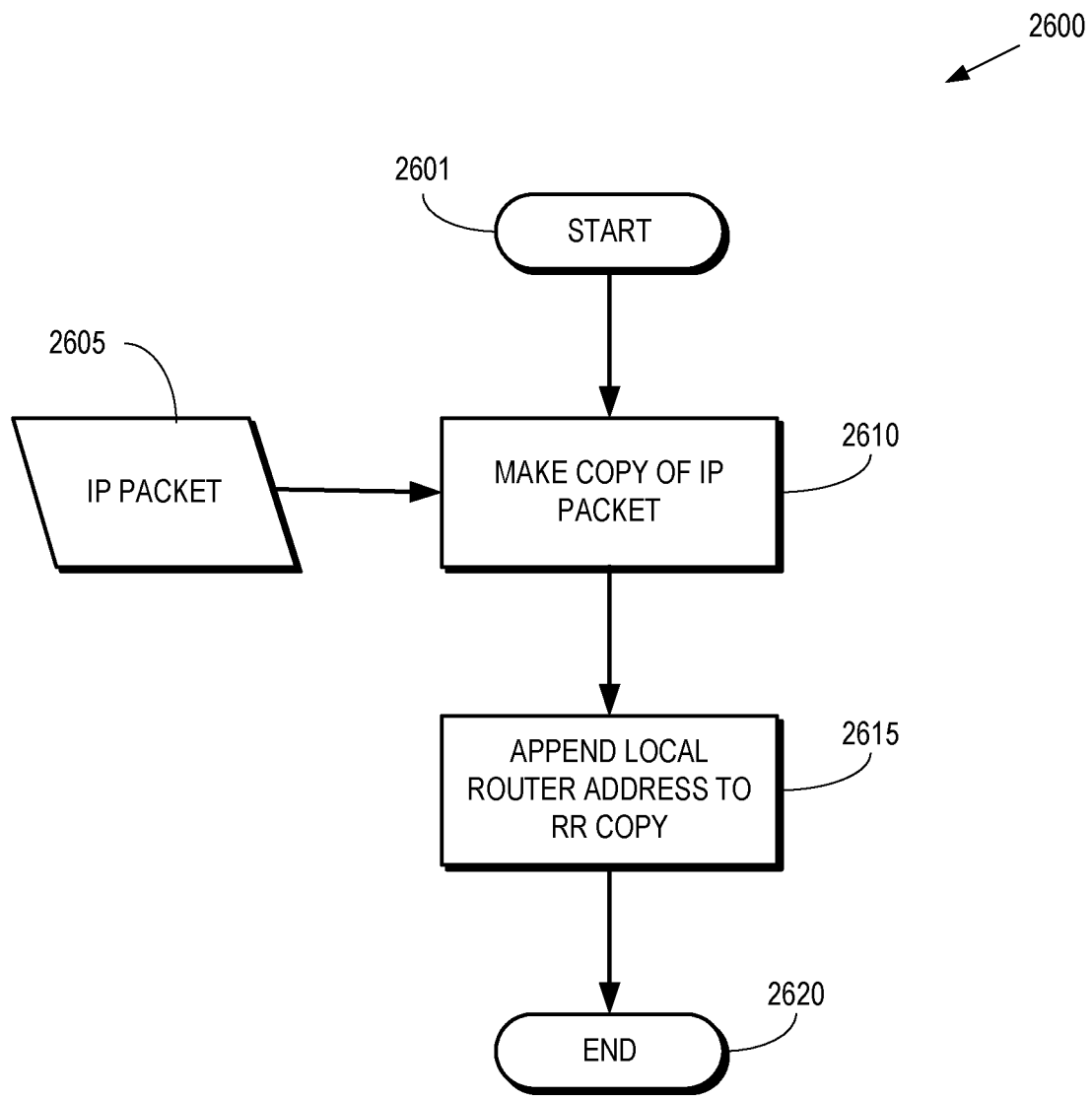
FIG. 26 is a flow diagram of a method of generating a copy of an IP packet for loop notification according to some embodiments.

FIG. 26 is a flow diagram of a method 2600 of generating a copy of an IP packet for loop notification according to some embodiments. The method 2600 is implemented by the nodes in some embodiments of the communication system 600 shown in FIG. 6. The method 2600 is also used to implement some embodiments of the block 2520 shown in FIG. 25.

The method 2600 begins at block 2601. At the input block 2605, the node receives the IP packet that has been detected in a loop. At block 2610, the node makes a copy of the IP packet. At block 2615, the node appends the locally configured router address of the node to the RR in the copy of the IP packet. The method 2600 then ends at the block 2620.

Figure 27:
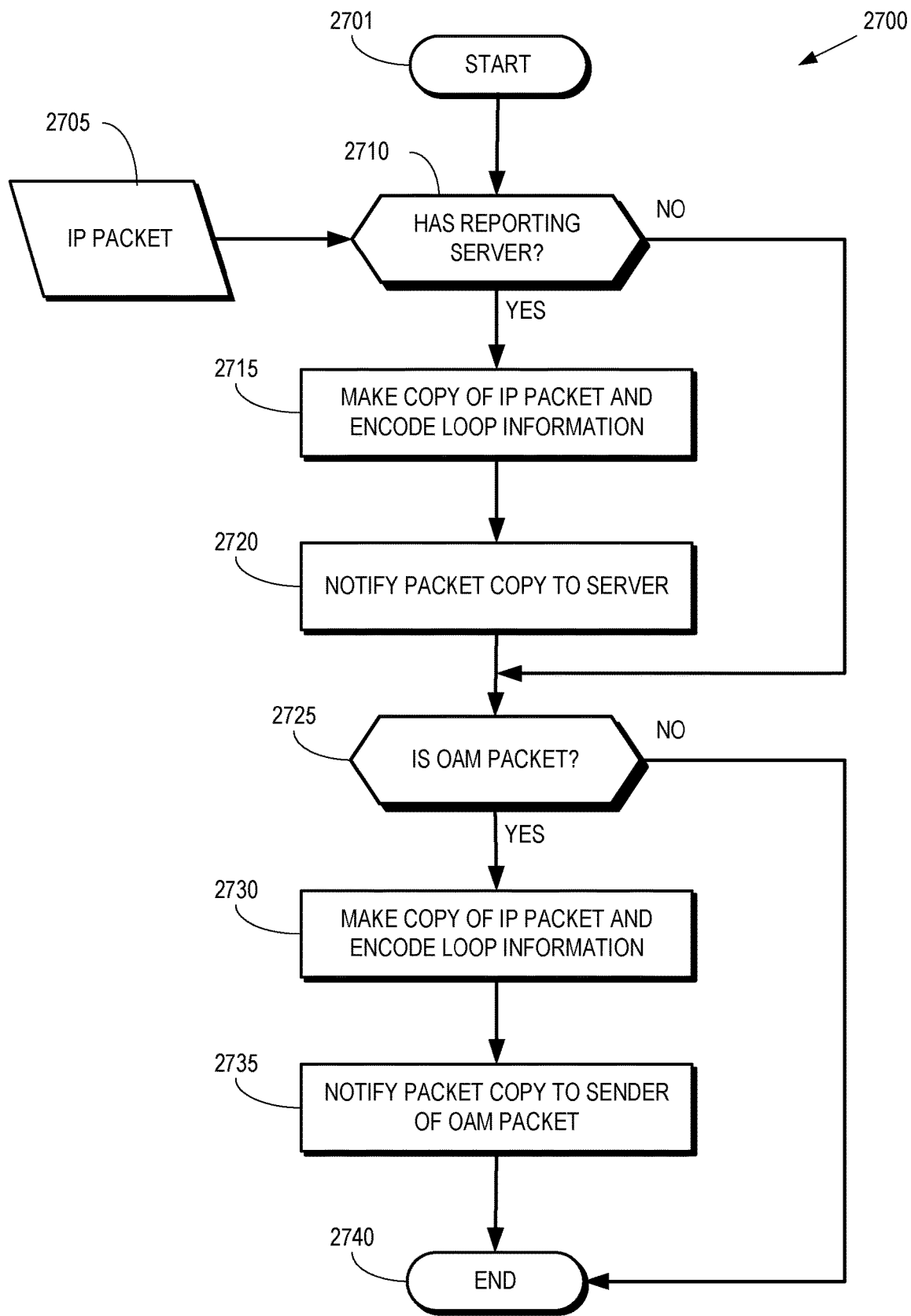
FIG. 27 is a flow diagram of a method of notifying detection of a loop according to some embodiments.

FIG. 27 is a flow diagram of a method 2700 of notifying detection of a loop according to some embodiments. The method 2700 is implemented by the nodes in some embodiments of the communication system 600 shown in FIG. 6. The method 2700 is an embodiment of the framework described in FIG. 25. The method 2700 implements the following two conditions for notifications of loop:

1. If a notification server is configured to notify the loops detected in the network to the server.
2. If the IP packet is a test/OAM packet (e.g. ICMP/ICMPv6 Packet) then notify the loop to the sender of the OAM packet.

The method 2700 begins at block 2701. At the input block 2705, the node receives the IP packet on which the loop has been detected and a notification is to be provided.

At decision block 2710, the node determines whether it is configured to notify loops to a reporting server. If the reporting server is available, the method 2700 flows to the block 2715. Otherwise, the method 2700 flows to the decision block 2725.

At block 2715, the node makes a copy of the IP packet and encodes the loop information into the packet. In some embodiments, the block 2715 is implemented using the method 2600 shown in FIG. 26.

At block 2720, the node transmits the copy of the IP packet to the reporting server with a notification indicating that the loop has been detected for the IP packet. In some embodiments, custom protocols are employed between the node and the server to perform the notification.

At decision block 2725, the node determines whether the input IP packet is a test packet or in OAM packet. For example, an OAM packet could be an ICMP packet or ICMPv6 packet. If the packet is a test packet or OAM packet, the method 2700 flows to the block 2730. Otherwise, the method 2700 flows to the block 2740 and the method 2700 ends.

At block 2730, the node makes a copy of the IP packet and encodes the loop information into the packet, e.g., using the method 2600 shown in FIG. 26. At block 2735, the node sends a reply to the sender of the OAM packet. The reply is sent with a loop detected notification. For example, ICMP or ICMPv6 provides methods for OAM on IP packets. The ICMP or ICMPv6 reply may be enhanced to perform this notification. The method 2700 then flows to the block 2740 and the method 2700 ends.

Figure 28:
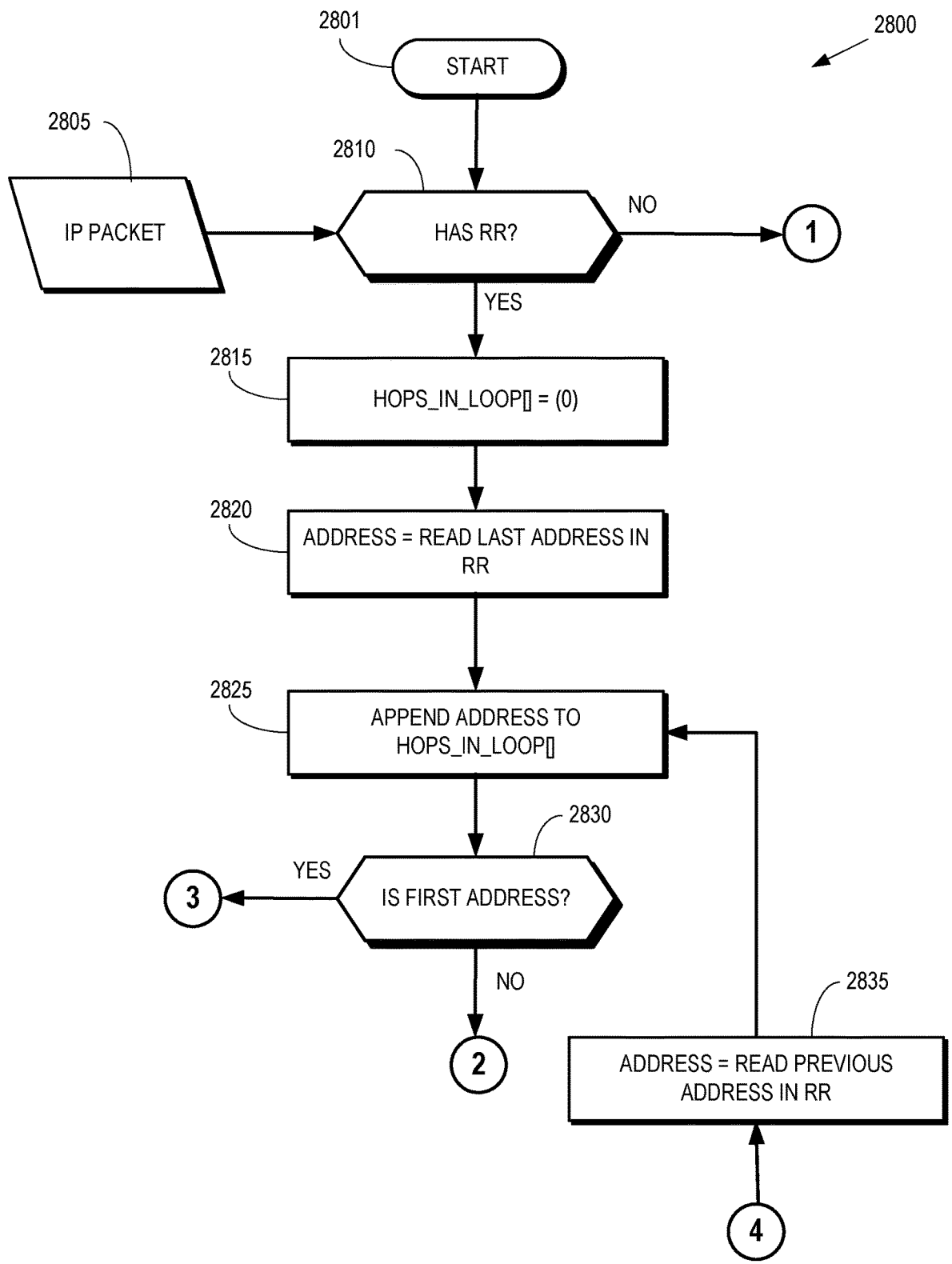
FIG. 28 is a flow diagram of a first portion of a method of processing a loop detected notification at a reporting entity such as a reporting server or a sender of an OAM packet according to some embodiments.

FIG. 28 is a flow diagram of a first portion of a method 2800 of processing a loop detected notification at a reporting entity such as a reporting server or a sender of an OAM packet according to some embodiments. The method 2800 is implemented by the nodes in some embodiments of the communication system 600 shown in FIG. 6.

The method 2800 begins at block 2801. At the input block 2805, the reporting entity receives the notification including the IP packet that has been detected in a loop.

At decision block 2810, the reporting entity determines whether the packet includes the RR that describes the loop. If the RR is not included, then the notification is considered a bad notification and the method 2800 flows to the node 1, which connect to the block 2915 in FIG. 29. If the RR is included in the packet, the method 2800 flows to the block 2815.

At block 2815, the reporting entity initializes the local variable Hops_in_Loop[ ], which is a list of router addresses as empty. The router addresses that subsequently appear in this list describe the loop. At block 2820, the reporting entity reads the last address in the RR. At block 2825, the reporting entity appends the address to the local variable Hops_in_Loop[ ].

At decision block 2830, the reporting entity determines whether this is the first address that has been inserted into the local variable Hops_in_Loop[ ]. If this is not the first address, the method 2800 flows to the node 2, which connects to the decision block 2900 in FIG. 29. If this is the first address, the method 2800 flows to the node 3, which connects to the decision block 2910 in FIG. 29.

Figure 29:
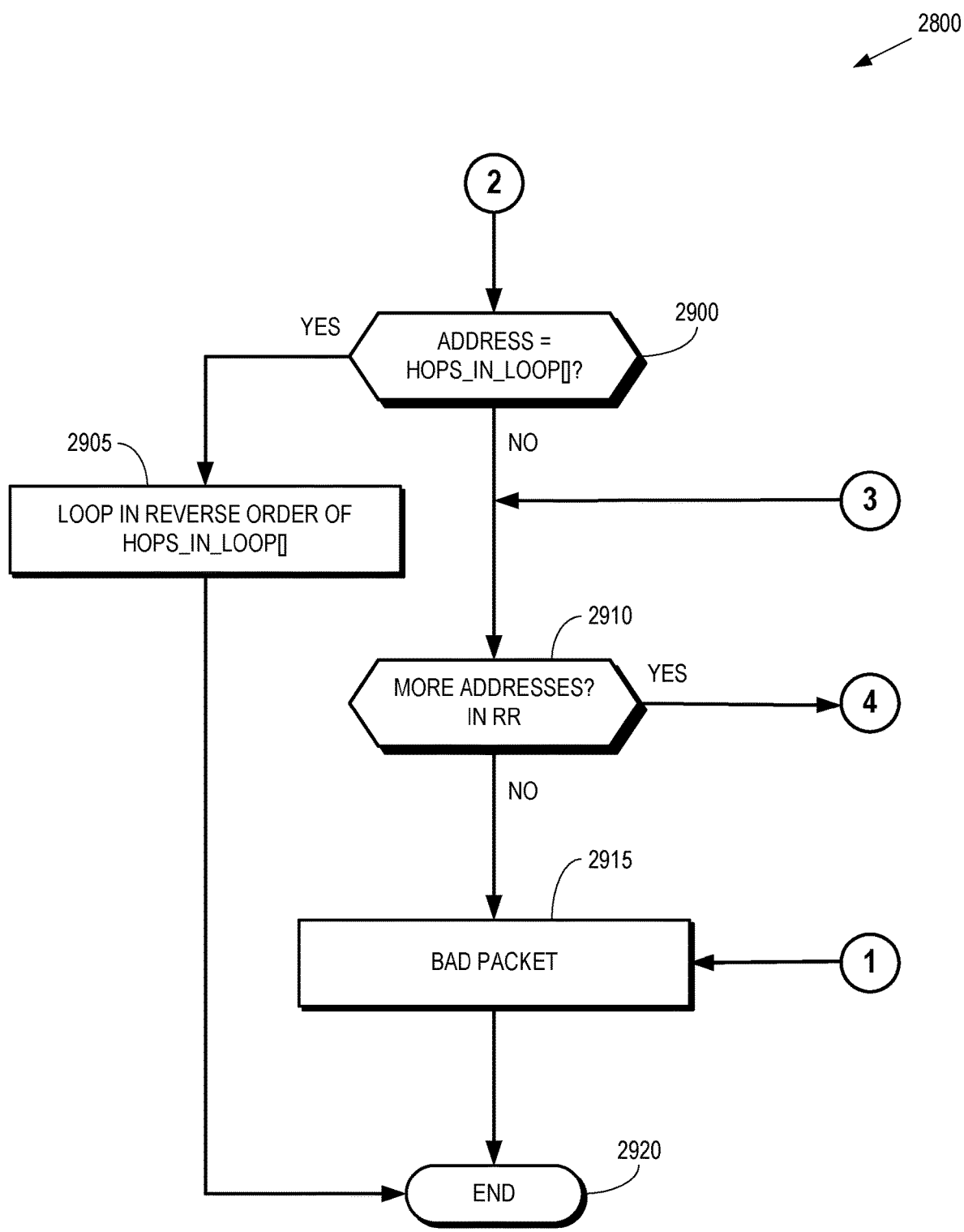
FIG. 29 is a flow diagram of a second portion of the method of processing the loop detected notification at the reporting entity according to some embodiments.

At the block 2835, the reporting entity reads the previous address in RR because the reporting entity is reading the addresses in RR in reverse order, as discussed herein with regard to FIG. 29. The block 2835 is connected to the decision block 2910 in FIG. 29 via the node 4.

FIG. 29 is a flow diagram of a second portion of the method 2800 of processing the loop detected notification at the reporting entity according to some embodiments. Node 1 connects the decision block 2915 to the decision block 2810 in FIG. 28. Node 2 connects the decision block 2900 to the decision block 2830 in FIG. 28. Node 3 connects the decision block 2910 to the decision block 2830 in FIG. 28. Node 4 connects the decision block 2910 to the block 2835 in FIG. 28.

At decision block 2900, the routing entity determines whether the recently read address matches the first entry in the local variable Hops_in_Loop[ ]. If so, the method 2800 flows to the block 2905. If not, the method 2800 flows to the decision block 2910.

At block 2905, the reporting entity publishes the local variable Hops_in_Loop[ ] in the reverse order from the hops in the loop. The method 2800 then flows to the block 2920 and the method 2800 ends.

At decision block 2910, the reporting entity determines whether there are more addresses to be read from the RR. If so, the method 2800 flows to node 4, which connects to the block 2825 in FIG. 28. If not, the method 2800 flows to the block 2915.

At block 2915, the reporting entity declares the packet is a bad packet because no loop is found in the RR. The method 2800 then flows to the block 2920 and the method 2800 ends.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
a) hardware-only circuit implementations (such as implementations and only analog and/or digital circuitry) and
b) combinations of hardware circuits and software, such as (as applicable):
  i. a combination of analog and/or digital hardware circuit(s) with software/firmware and
  ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus, comprising:
   at least one processor; and
   at least one memory storing instructions that, when executed by the at least one processor, cause the apparatus to:
   maintain, by a node, an identifier of the node;
   receive, by the node, an Internet Protocol (IP) packet including a recorded route, wherein the recorded route is configured to record hops of a path traversed by the IP packet;
   determine, by the node based on a determination as to whether the identifier of the node is included in the recorded route of the IP packet, whether the IP packet is associated with a loop; and
   perform, by the node based on a determination that the IP packet is not associated with a loop, insertion of the identifier of the node into the recorded route and forwarding of the IP packet toward a next hop node.

2. The apparatus of claim 1, wherein the identifier of the node is a router address of the node or an IP address of the node.

3. The apparatus of claim 1, wherein the instructions, when executed by the at least one processor, cause the apparatus to:
   receive a second IP packet including a second recorded route, wherein the second recorded route is configured to record hops of a second path traversed by the second IP packet;
   determine, based on a determination as to whether the identifier of the node is included in the second recorded route of the second IP packet, whether the second IP packet is associated with a loop; and
   drop the IP packet in response to a determination that the second IP packet is associated with a loop.

4. The apparatus of claim 3, wherein the instructions, when executed by the at least one processor, cause the apparatus to:
   generate a loop detection notification including information identifying the node and the second recorded route in response to a determination that the second IP packet is associated with a loop.

5. The apparatus of claim 4, wherein the instructions, when executed by the at least one processor, cause the apparatus to:
   send the loop detection notification toward a reporting entity.

6. A method comprising:
   maintaining, by a node, an identifier of the node;
   receiving, by the node, an Internet Protocol (IP) packet including a recorded route, wherein the recorded route is configured to record hops of a path traversed by the IP packet;
   determining, by the node based on a determination as to whether the identifier of the node is included in the recorded route of the IP packet, whether the IP packet is associated with a loop; and
   performing, by the node based on a determination that the IP packet is not associated with a loop, insertion of the identifier of the node into the recorded route and forwarding of the IP packet toward a next hop node.

7. The method of claim 6, wherein the identifier of the node is a router address of the node or an IP address of the node.

8. The method of claim 6, further comprising:
   receiving a second IP packet including a second recorded route, wherein the second recorded route is configured to record hops of a second path traversed by the second IP packet;
   determining, based on a determination as to whether the identifier of the node is included in the second recorded route of the second IP packet, whether the second IP packet is associated with a loop; and
   dropping the IP packet in response to a determination that the second IP packet is associated with a loop.

9. The method of claim 8, further comprising:
   generating a loop detection notification including information identifying the node and the second recorded route in response to a determination that the second IP packet is associated with a loop.

10. The method of claim 9, further comprising:
    sending the loop detection notification toward a reporting entity.

11. A node An apparatus, comprising:
    at least one memory; and
    at least one processor storing instructions which, when executed by the at least one processor, cause the apparatus at least to:
    maintain, by a node, an identifier of the node; and
    insert, within an Internet Protocol (IP) packet based on a determination that the IP packet is being rerouted from a first path to a second path based on a failure associated with the first path, a recorded route including the identifier of the node, wherein the recorded route is configured to record hops of the second path to be traversed by the IP packet.

* * * * *

UNITED STATES PATENT AND TRADEMARK OFFICE
CERTIFICATE OF CORRECTION

PATENT NO. : 12,132,605 B2
APPLICATION NO. : 17/104338
DATED : October 29, 2024
INVENTOR(S) : Pranjal Kumar Dutta Page 1 of 1

It is certified that error appears in the above-identified patent and that said Letters Patent is hereby corrected as shown below:

In the Claims

In Column 22, Line 44, Claim 11, delete "A node An apparatus," and insert -- An apparatus, --.

Signed and Sealed this
Thirty-first Day of December, 2024

Derrick Brent
*Acting Director of the United States Patent and Trademark Office*